United States Patent
Mikura et al.

(10) Patent No.: US 10,265,585 B2
(45) Date of Patent: *Apr. 23, 2019

(54) GOLF BALL

(71) Applicant: SUMITOMO RUBBER INDUSTRIES, LTD., Kobe-shi, Hyogo (JP)

(72) Inventors: Chiemi Mikura, Kobe (JP); Kazuhisa Fushihara, Kobe (JP); Mikio Yamada, Kobe (JP); Shun Kurihara, Kobe (JP); Ayaka Shindo, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 15/295,748

(22) Filed: Oct. 17, 2016

(65) Prior Publication Data

US 2017/0036068 A1 Feb. 9, 2017

Related U.S. Application Data

(63) Continuation-in-part of application No. 13/337,607, filed on Dec. 27, 2011, now Pat. No. 9,486,673, and a continuation-in-part of application No. 13/309,965, filed on Dec. 2, 2011, now Pat. No. 9,566,476.

(30) Foreign Application Priority Data

| Dec. 3, 2010 | (JP) | 2010-270767 |
|---|---|---|
| Dec. 29, 2010 | (JP) | 2010-294589 |
| Mar. 2, 2011 | (JP) | 2011-045286 |
| Jul. 27, 2011 | (JP) | 2011-164724 |
| Jul. 27, 2011 | (JP) | 2011-164725 |
| Nov. 16, 2011 | (JP) | 2011-250602 |

(51) Int. Cl.

| *A63B 37/02* | (2006.01) |
|---|---|
| *C08K 5/098* | (2006.01) |
| *A63B 37/00* | (2006.01) |
| *A63B 45/00* | (2006.01) |
| *C08K 5/09* | (2006.01) |
| *C08K 5/372* | (2006.01) |
| *C08K 5/375* | (2006.01) |

(52) U.S. Cl.
CPC ...... *A63B 37/0054* (2013.01); *A63B 37/0003* (2013.01); *A63B 37/0009* (2013.01); *A63B 37/009* (2013.01); *A63B 37/0018* (2013.01); *A63B 37/0022* (2013.01); *A63B 37/0051* (2013.01); *A63B 37/0063* (2013.01); *A63B 37/0064* (2013.01); *A63B 37/0074* (2013.01); *A63B 37/0075* (2013.01); *A63B 37/0076* (2013.01); *A63B 37/0078* (2013.01); *A63B 37/0084* (2013.01); *A63B 37/0087* (2013.01); *A63B 37/0094* (2013.01); *A63B 37/0096* (2013.01); *A63B 45/00* (2013.01); *C08K 5/09* (2013.01); *C08K 5/098* (2013.01); *C08K 5/372* (2013.01); *C08K 5/375* (2013.01)

(58) Field of Classification Search
None
See application file for complete search history.

(56) References Cited

U.S. PATENT DOCUMENTS

| 4,688,801 A | 8/1987 | Reiter |
|---|---|---|
| 4,726,590 A | 2/1988 | Molitor |
| 4,788,229 A | 11/1988 | Bohm et al. |
| 4,838,556 A | 6/1989 | Sullivan |
| 4,844,471 A | 7/1989 | Terence et al. |
| 4,852,884 A | 8/1989 | Sullivan |
| 5,018,740 A | 5/1991 | Sullivan |
| 5,184,828 A | 2/1993 | Kim et al. |
| 5,403,010 A | 4/1995 | Yabuki et al. |
| 5,816,944 A | 10/1998 | Asakura et al. |

(Continued)

FOREIGN PATENT DOCUMENTS

| EP | 1358914 A1 | 11/2003 |
|---|---|---|
| EP | 2537887 A2 | 12/2012 |

(Continued)

OTHER PUBLICATIONS

Dupont, "Hardness Conversion", uploaded May 27, 2014, 1 page, cited in the U.S. Office Action, dated May 30, 2014, for U.S. Appl. No. 13/494,315.
European Office Action, dated Mar. 4, 2014, for European Application No. 12172572.3.
Examiner's Calc. JIS-C hardness converted by Dupont, May 27, 2014, cited in the U.S. Office Action, dated May 30, 2014, for U.S. Appl. No. 13/494,315.
Extended European Search Report, dated Dec. 19, 2013, for European Application No. 12199433.9.
Extended European Search Report, dated Mar. 5, 2013, for European Application No. 12172666.5.

(Continued)

*Primary Examiner* — David J Buttner
(74) *Attorney, Agent, or Firm* — Birch, Stewart, Kolasch & Birch LLP

(57) ABSTRACT

An object of the present invention is to provide a golf ball excellent in flying performance, in particular, to provide a golf ball traveling a great flight distance. The present invention provides a golf ball having a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d1) an aromatic carboxylic acid or (d2) an aromatic carboxylic acid salt, provided that the rubber composition further contains (e) a metal compound in the case of containing only (b) the α,β-unsaturated carboxylic acid having 3 to 8 carbon atoms as the co-crosslinking agent.

8 Claims, 14 Drawing Sheets

(56) References Cited

U.S. PATENT DOCUMENTS

| | | | |
|---|---|---|---|
| 5,830,085 A | 11/1998 | Higuchi et al. | |
| 6,056,650 A | 5/2000 | Yamagishi et al. | |
| 6,193,920 B1 * | 2/2001 | Moriyama | B29C 39/10 |
| | | | 264/250 |
| 6,258,302 B1 | 7/2001 | Nesbitt | |
| 6,277,036 B1 | 8/2001 | Hayashi et al. | |
| 6,277,920 B1 | 8/2001 | Nesbitt | |
| 6,302,810 B2 | 10/2001 | Yokota | |
| 6,390,936 B1 | 5/2002 | Sugimoto | |
| 6,419,595 B1 | 7/2002 | Maruko et al. | |
| 6,465,646 B1 | 10/2002 | Beard et al. | |
| 6,486,261 B1 * | 11/2002 | Wu | A63B 37/0003 |
| | | | 473/374 |
| 6,561,929 B2 | 5/2003 | Watanabe | |
| 6,596,797 B2 | 7/2003 | Nesbitt | |
| 6,652,393 B1 | 11/2003 | Watanabe | |
| 6,666,780 B2 | 12/2003 | Watanabe | |
| 6,705,956 B1 | 3/2004 | Moriyama et al. | |
| 6,726,579 B2 | 4/2004 | Ohama et al. | |
| 6,762,247 B2 | 7/2004 | Voorheis et al. | |
| 6,815,507 B2 | 11/2004 | Ohama | |
| 6,919,393 B2 | 7/2005 | Mano et al. | |
| 7,086,970 B2 | 8/2006 | Hayashi et al. | |
| 7,300,363 B2 | 11/2007 | Kasashima | |
| 7,329,194 B2 | 2/2008 | Watanabe et al. | |
| 7,344,455 B1 | 3/2008 | Higuchi | |
| 7,682,266 B2 | 3/2010 | Endo et al. | |
| 7,914,397 B2 | 3/2011 | Endo et al. | |
| 8,044,184 B2 | 10/2011 | Ishikawa | |
| 8,367,779 B1 * | 2/2013 | Ozawa | C08K 5/098 |
| | | | 525/331.9 |
| 8,393,978 B2 | 3/2013 | Watanabe et al. | |
| 8,523,707 B2 | 9/2013 | Watanabe et al. | |
| 8,722,752 B2 | 5/2014 | Kuwamura et al. | |
| 8,777,780 B2 | 7/2014 | Kamino et al. | |
| 9,162,112 B2 | 10/2015 | Mikura et al. | |
| 9,174,092 B2 | 11/2015 | Sakamine et al. | |
| 9,205,309 B2 | 12/2015 | Isogawa et al. | |
| 9,283,441 B2 | 3/2016 | Sajima et al. | |
| 9,283,442 B2 | 3/2016 | Shindo et al. | |
| 9,302,158 B2 * | 4/2016 | Shindo | A63B 37/0063 |
| 9,498,681 B2 * | 11/2016 | Okabe | C08K 5/098 |
| 9,566,476 B2 * | 2/2017 | Mikura | A63B 37/0003 |
| 9,873,022 B2 * | 1/2018 | Sakamine | A63B 37/0051 |
| 2001/0026027 A1 | 10/2001 | Nesbitt | |
| 2001/0034412 A1 | 10/2001 | Nesbitt | |
| 2002/0032077 A1 | 3/2002 | Watanabe | |
| 2002/0052254 A1 | 5/2002 | Ichikawa et al. | |
| 2002/0155905 A1 | 10/2002 | Iwami | |
| 2002/0187856 A1 | 12/2002 | Endou | |
| 2003/0114249 A1 | 6/2003 | Voorheis et al. | |
| 2003/0114252 A1 | 6/2003 | Hayashi et al. | |
| 2003/0119606 A1 | 6/2003 | Ohama et al. | |
| 2003/0134946 A1 | 7/2003 | Kataoka | |
| 2003/0144425 A1 | 7/2003 | Mano et al. | |
| 2003/0171165 A1 | 9/2003 | Watanabe | |
| 2003/0207999 A1 | 11/2003 | Higuchi et al. | |
| 2003/0208000 A1 | 11/2003 | Higuchi et al. | |
| 2004/0029650 A1 | 2/2004 | Higuchi et al. | |
| 2004/0106475 A1 | 6/2004 | Sasaki et al. | |
| 2004/0110906 A1 | 6/2004 | Fujisawa et al. | |
| 2005/0137031 A1 | 6/2005 | Kataoka et al. | |
| 2005/0187353 A1 | 8/2005 | Goguen et al. | |
| 2005/0245652 A1 * | 11/2005 | Bulpett | A63B 37/0003 |
| | | | 524/289 |
| 2005/0250599 A1 | 11/2005 | Watanabe et al. | |
| 2006/0019771 A1 | 1/2006 | Kennedy, III et al. | |
| 2006/0025238 A1 | 2/2006 | Endo et al. | |
| 2006/0128900 A1 | 6/2006 | Nanba et al. | |
| 2006/0135287 A1 | 6/2006 | Kennedy, III et al. | |
| 2006/0166762 A1 | 7/2006 | Kim et al. | |
| 2006/0178231 A1 | 8/2006 | Kasashima | |
| 2006/0281587 A1 * | 12/2006 | Voorheis | A63B 37/0021 |
| | | | 473/371 |
| 2007/0129174 A1 | 6/2007 | Higuchi | |
| 2007/0173607 A1 | 7/2007 | Kennedy, III et al. | |
| 2007/0281801 A1 | 12/2007 | Watanabe et al. | |
| 2007/0281802 A1 | 12/2007 | Watanabe et al. | |
| 2008/0020863 A1 | 1/2008 | Higuchi et al. | |
| 2008/0020864 A1 | 1/2008 | Shindo et al. | |
| 2008/0076603 A1 | 3/2008 | Shindo et al. | |
| 2008/0161134 A1 | 7/2008 | Tarao | |
| 2008/0194357 A1 | 8/2008 | Higuchi | |
| 2008/0194358 A1 | 8/2008 | Higuchi | |
| 2008/0194359 A1 | 8/2008 | Higuchi et al. | |
| 2008/0214324 A1 | 9/2008 | Nanba et al. | |
| 2008/0214325 A1 | 9/2008 | Higuchi et al. | |
| 2008/0274835 A1 | 11/2008 | Comeau et al. | |
| 2008/0305890 A1 | 12/2008 | Watanabe et al. | |
| 2008/0312008 A1 | 12/2008 | Higuchi et al. | |
| 2009/0105013 A1 | 4/2009 | Slagel et al. | |
| 2009/0107608 A1 | 4/2009 | Sandstrom | |
| 2009/0111611 A1 | 4/2009 | Kimura et al. | |
| 2009/0124757 A1 | 5/2009 | Shindo et al. | |
| 2009/0143169 A1 | 6/2009 | Shiga et al. | |
| 2009/0227394 A1 | 9/2009 | Bulpett et al. | |
| 2010/0009776 A1 | 1/2010 | Okabe et al. | |
| 2010/0069175 A1 | 3/2010 | Kamino et al. | |
| 2010/0137076 A1 | 6/2010 | Endo et al. | |
| 2010/0216905 A1 | 8/2010 | Kuwamura et al. | |
| 2010/0273575 A1 | 10/2010 | Watanabe | |
| 2010/0298067 A1 | 11/2010 | Watanabe | |
| 2010/0304893 A1 | 12/2010 | De Garavilla | |
| 2010/0323819 A1 * | 12/2010 | Comeau | A63B 37/0003 |
| | | | 473/376 |
| 2011/0092315 A1 | 4/2011 | Nakamura et al. | |
| 2011/0143861 A1 | 6/2011 | Watanabe et al. | |
| 2011/0143862 A1 | 6/2011 | Watanabe et al. | |
| 2011/0159068 A1 | 6/2011 | Ohama et al. | |
| 2011/0300968 A1 | 12/2011 | Ryu et al. | |
| 2012/0088604 A1 | 4/2012 | Matsuyama et al. | |
| 2012/0172149 A1 | 7/2012 | Mikura et al. | |
| 2012/0172150 A1 | 7/2012 | Mikura et al. | |
| 2012/0196699 A1 | 8/2012 | De Garavilla | |
| 2012/0329574 A1 | 12/2012 | Mikura et al. | |
| 2012/0329575 A1 | 12/2012 | Mikura et al. | |
| 2013/0005506 A1 | 1/2013 | Isogawa et al. | |
| 2013/0005507 A1 | 1/2013 | Sajima et al. | |
| 2013/0005508 A1 | 1/2013 | Matsuyama et al. | |
| 2013/0017905 A1 | 1/2013 | Shindo et al. | |
| 2013/0053182 A1 | 2/2013 | Tarao et al. | |
| 2013/0065707 A1 | 3/2013 | Matsuyama | |
| 2013/0123044 A1 | 5/2013 | Mikura et al. | |
| 2013/0123045 A1 | 5/2013 | Watanabe et al. | |
| 2013/0172111 A1 | 7/2013 | Sakamine et al. | |
| 2013/0244810 A1 | 9/2013 | Mikura et al. | |
| 2013/0288824 A1 * | 10/2013 | Isogawa | A63B 37/0059 |
| | | | 473/373 |
| 2013/0303307 A1 | 11/2013 | Sakamine et al. | |
| 2013/0316850 A1 | 11/2013 | Inoue et al. | |
| 2013/0324631 A1 | 12/2013 | Kuwamura et al. | |
| 2014/0357406 A1 | 12/2014 | Shindo et al. | |
| 2016/0008666 A1 * | 1/2016 | Sakamine | A63B 37/0051 |
| | | | 473/377 |
| 2016/0310196 A1 | 10/2016 | Johansson et al. | |
| 2017/0304684 A1 * | 10/2017 | Isogawa | A63B 37/0059 |

FOREIGN PATENT DOCUMENTS

| | | | |
|---|---|---|---|
| EP | 2537888 A2 | 12/2012 | |
| JP | 61-37178 A | 2/1986 | |
| JP | 61/113475 A | 5/1986 | |
| JP | 61-253079 A | 11/1986 | |
| JP | 61-258844 A | 11/1986 | |
| JP | 62-14870 A | 1/1987 | |
| JP | 62014870 | * 1/1987 | |
| JP | 62-82981 A | 4/1987 | |
| JP | 6-154357 A | 6/1994 | |
| JP | 8-322964 A | 12/1996 | |
| JP | 9-313643 A | 12/1997 | |
| JP | 11-9720 A | 1/1999 | |
| JP | 11-47309 A | 2/1999 | |
| JP | 2000-80999 A | 2/2000 | |

(56) References Cited

FOREIGN PATENT DOCUMENTS

| | | | |
|---|---|---|---|
| JP | 2000-84118 A | 3/2000 |
| JP | 2000-245873 A | 9/2000 |
| JP | 2000-271248 A | 10/2000 |
| JP | 2001-17569 A | 1/2001 |
| JP | 2002-764 A | 1/2002 |
| JP | 2002-540821 A | 12/2002 |
| JP | 2003-135627 A | 5/2003 |
| JP | 2003-164546 A | 6/2003 |
| JP | 2003-180872 A | 7/2003 |
| JP | 2003-226782 A | 8/2003 |
| JP | 2003-320054 A | 11/2003 |
| JP | 2003-320055 A | 11/2003 |
| JP | 2003-325703 A | 11/2003 |
| JP | 2004-73856 A | 3/2004 |
| JP | 2004-167052 A | 6/2004 |
| JP | 2005-179522 A | 7/2005 |
| JP | 2006-34740 A | 2/2006 |
| JP | 2006-218294 A | 8/2006 |
| JP | 2006239405 A | 9/2006 |
| JP | 2006-297108 A | 11/2006 |
| JP | 2007-152090 A | 6/2007 |
| JP | 2007-319660 A | 12/2007 |
| JP | 2008-523952 A | 7/2008 |
| JP | 2008-194471 A | 8/2008 |
| JP | 2008-194473 A | 8/2008 |
| JP | 2008-212681 A | 9/2008 |
| JP | 2009-11431 A | 1/2009 |
| JP | 2009-11436 A | 1/2009 |
| JP | 2009-119256 A | 6/2009 |
| JP | 2009-131508 A | 6/2009 |
| JP | 2010-88997 A | 4/2010 |
| JP | 2010-162323 A | 7/2010 |
| JP | 2010-162336 A | 7/2010 |
| JP | 2010-253268 A | 11/2010 |
| JP | 2011-83395 A | 4/2011 |
| JP | 2011-120898 A | 6/2011 |
| JP | 2011-255172 A | 12/2011 |
| KR | 10-0995019 B1 | 11/2010 |
| WO | WO 2009/051114 A1 | 4/2009 |

OTHER PUBLICATIONS

Extended European Search Report, dated Mar. 5, 2013, for European Application No. 12172672.3.
Japanese Notice of Reasons for Rejection, dated Jul. 28, 2015, for Japanese Application No. 2011-250602.
Japanese Notice of Reasons for Rejection, dated Oct. 15, 2013, for Japanese Application No. 2011-139901.
Japanese Notice of Reasons for Rejection, dated Oct. 15, 2013, for Japanese Application No. 2011-164724.
Japanese Notice of Reasons for Rejection, dated Oct. 15, 2013, for Japanese Application No. 2011-164725.
Japanese Notice of Reasons for Rejection, dated Oct. 15, 2013, for Japanese Application No. 2012-116655.
Japanese Notice of Reasons for Rejection, dated Oct. 21, 2014, for Japanese Application No. 2010-294589.
U.S. Office Action, dated Apr. 24, 2014, for U.S. Appl. No. 13/599,441.
U.S. Office Action, dated Feb. 10, 2014, for U.S. Appl. No. 13/309,965.
U.S. Office Action, dated Feb. 6, 2014, for U.S. Appl. No. 13/337,607.
U.S. Office Action, dated Jul. 25, 2014, for U.S. Appl. No. 13/545,658.
U.S. Office Action, dated May 21, 2014, for U.S. Appl. No. 13/309,965.
U.S. Office Action, dated May 29, 2014, for U.S. Appl. No. 13/606,378.
U.S. Office Action, dated May 30, 2014, for U.S. Appl. No. 13/494,315.
U.S. Office Action, dated May 8, 2014, for U.S. Appl. No. 13/338,868.
U.S. Office Action, dated May 8, 2014, for U.S. Appl. No. 13/339,051.

* cited by examiner

GOLF BALL

CROSS REFERENCE

This application is a 37 C.F.R. § 1.53(b) continuation of, and claims priority to, U.S. application Ser. No. 13/309,965 now U.S. Pat. No. 9,566,476, filed Dec. 2, 2011 and U.S. application Ser. No. 13/337,607 now U.S. Pat. No. 9,486,673, filed on Dec. 27, 2011. Priority is also claimed to Japanese Patent application No. 2010-270767 filed on Dec. 3, 2010, Japanese Patent application No. 2011-045286 filed on Mar. 2, 2011, Japanese patent application No. 2011-164724 filed on Jul. 27, 2011, Japanese patent application No. 2011-250602 filed on Nov. 16, 2011, Japanese patent application No. 2010-294589 filed on Dec. 29, 2010, and Japanese patent application No. 2011-164725 filed on Jul. 27, 2011. The entire contents of each these applications are hereby incorporated by reference.

FIELD OF THE INVENTION

The present invention relates to a golf ball excellent in flying performance, in particular, an improvement of a core of a golf ball.

DESCRIPTION OF THE RELATED ART

As a method for improving flight distance on driver shots, for example, there are methods of using a core having high resilience and using a core having a hardness distribution in which the hardness increases toward the surface of the core from the center thereof. The former method has an effect of enhancing an initial speed, and the latter method has an effect of a higher launch angle and a lower spin rate. A golf ball having a higher launch angle and a low spin rate travels a great distance.

For example, Japanese Patent Publications Nos. S61-37178 A, S61-113475 A, S61-253079 A, 2008-212681 A, 2008-523952 A and 2009-119256 A disclose a technique of enhancing resilience of the core. Japanese Patent Publication No. S61-37178 A and S61-113475 A disclose a solid golf ball having an inner core where zinc acrylate as a co-crosslinking agent, palmitic acid, stearic acid, or myristic acid as a co-crosslinking activator, zinc oxide as another co-crosslinking activator, and a reaction rate retarder are blended.

Japanese Patent Publication No. S61-253079 A discloses a solid golf ball formed from a rubber composition containing an α,β-unsaturated carboxylic acid in an amount of 15 parts to 35 parts by weight, a metal compound to react with the α,β-unsaturated carboxylic acid and form a salt thereof in an amount of 7 parts to 60 parts by weight, and a high fatty acid metal salt in an amount of 1 part to 10 parts by weight with respect to 100 parts by weight of a base rubber.

Japanese Patent Publication No. 2008-212681 A discloses a golf ball comprising, as a component, a molded and crosslinked product obtained from a rubber composition essentially comprising a base rubber, a filler, an organic peroxide, an α,β-unsaturated carboxylic acid and/or a metal salt thereof, a copper salt of a saturated or unsaturated fatty acid.

Japanese Patent Publication No. 2008-523952 T discloses a golf ball, or a component thereof, molded from a composition comprising a base elastomer selected from the group consisting of polybutadiene and mixtures of polybutadiene with other elastomers, at least one metallic salt of an unsaturated monocarboxylic acid, a free radical initiator, and a non-conjugated diene monomer.

Japanese Patent Publication No. 2009-119256 A discloses a method of manufacturing a golf ball, comprising preparing a masterbatch of an unsaturated carboxylic acid and/or a metal salt thereof by mixing the unsaturated carboxylic acid and/or the metal salt thereof with a rubber material ahead, using the masterbatch to prepare a rubber composition containing the rubber material, and employing a heated and molded product of the rubber composition as a golf ball component, wherein the masterbatch of the unsaturated carboxylic acid and/or the metal salt thereof comprises; (A) from 20 wt % to 100 wt % of a modified polybutadiene obtained by modifying a polybutadiene having a vinyl content of from 0 to 2%, a cis-1,4 bond content of at least 80% and active terminals, the active terminal being modified with at least one type of alkoxysilane compound, and (B) from 80 wt % to 0 wt % of a diene rubber other than (A) the above rubber component [the figures are represented by wt % in the case that a total amount of (A) and (B) equal to 100 wt %] and (C) an unsaturated carboxylic acid and/or a metal salt thereof.

For example, Japanese Patent Publications Nos. H6-154357 A, 2008-194471 A, 2008-194473 A and 2010-253268 A disclose a core having a hardness distribution. Japanese Patent Publication No. H6-154357 A discloses a two-piece golf ball comprising a core formed of a rubber composition containing a base rubber, a co-crosslinking agent, and an organic peroxide, and a cover covering said core, wherein the core has the following hardness distribution according to JIS-C type hardness meter readings: (1) hardness at center: 58-73, (2) hardness at 5 to 10 mm from center: 65-75, (3) hardness at 15 mm from center: 74-82, (4) surface hardness: 76-84, wherein hardness (2) is almost constant within the above range, and the relation (1)<(2)<(3)≤(4) is satisfied.

Japanese Patent Publication No. 2008-194471 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, an inorganic filler, and an antioxidant; the solid core has a deformation from 2.0 mm to 4.0 mm, when applying a load from an initial load of 10 kgf to a final load of 130 kgf and has the hardness distribution shown in the following table.

TABLE 1

| Hardness distribution in solid core | Shore D harness |
|---|---|
| Center | 30 to 48 |
| Region located 4 mm from center | 34 to 52 |
| Region located 8 mm from center | 40 to 58 |
| Region located 12 mm from center (Q) | 43 to 61 |
| Region located 2 to 3 mm inside of surface (R) | 36 to 54 |
| Surface (S) | 41 to 59 |
| Hardness difference [(Q) − (S)] | 1 to 10 |
| Hardness difference [(S) − (R)] | 3 to 10 |

Japanese Patent Publication No. 2008-194473 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, and an inorganic filler; the solid core has a deformation from 2.0 mm to 4.0 mm, when applying a load from an initial load of 10 kgf to a final load of 130 kgf and has the hardness distribution shown in the following table.

TABLE 2

| Hardness distribution in solid core | Shore D harness |
|---|---|
| Center | 25 to 45 |
| Region located 5 to 10 mm from center | 39 to 58 |
| Region located 15 mm from center | 36 to 55 |
| Surface (S) | 55 to 75 |
| Hardness difference between center and surface | 20 to 50 |

Japanese Patent Publication No. 2010-253268 A discloses a multi-piece solid golf ball comprising a core, an envelope layer encasing the core, an intermediate layer encasing the envelope layer, and a cover which encases the intermediate layer and has formed on a surface thereof a plurality of dimples, wherein the core is formed primarily of a rubber material and has a hardness which gradually increases from a center to a surface thereof, the hardness difference in JIS-C hardness units between the core center and the core surface being at least 15 and, letting (I) be the average value for cross-sectional hardness at a position about 15 mm from the core center and at the core center and letting (II) be the cross-sectional hardness at a position about 7.5 mm from the core center, the hardness difference (I)—(II) in JIS-C units being within ±2; and the envelope layer, intermediate layer and cover have hardness which satisfy the condition: cover hardness>intermediate layer hardness>envelope layer hardness.

An object of the present invention is to provide a golf ball excellent in flying performance, in particular, to provide a golf ball traveling a great flight distance.

The present invention provides a golf ball comprising a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a carboxylic acid or a salt thereof, provided that the rubber composition further contains (e) a metal compound in the case of containing only (b) the α,β-unsaturated carboxylic acid having 3 to 8 carbon atoms as the co-crosslinking agent. The present invention is configured as described above and a gist of the present invention resides in that the spherical core has a hardness distribution where the hardness increases linearly or almost linearly from the center of the core toward the surface thereof. The spherical core having hardness distribution where the hardness increases linearly or almost linearly from the center of the core toward the surface thereof, with a high degree of the outer-hard and inner soft structure reduces the spin rate on driver shots, thereby providing a greater flight distance on driver shots.

In the golf ball of the present invention, the reason why the core has hardness distribution where the hardness increases linearly or almost linearly from the center of the core toward the surface thereof is considered as follows. (b) The metal salt of the α,β-unsaturated carboxylic acid having 3 to 8 carbon atoms blended in the rubber composition is considered to form an ion cluster in the core thereby crosslinking the rubber molecules with metals. (d) The carboxylic acid or a salt thereof reacts with the metal salt of (b) the α,β-unsaturated carboxylic acid having 3 to 8 carbon atoms to give the metal salt of the carboxylic acid, when molding the core. That is, (d) the carboxylic acid or the salt thereof exchanges a cation with the metal salt of the α,β-unsaturated carboxylic acid having 3 to 8 carbon atoms, thereby breaking the metal crosslinking by the metal salt of the α,β-unsaturated carboxylic acid having 3 to 8 carbon atoms. This cation exchange reaction easily occurs at the core central part where the temperature is high, and less occurs toward the core surface. When molding a core, the internal temperature of the core is high at the core central part and decreases toward the core surface, since reaction heat from a crosslinking reaction of the base rubber accumulates at the core central part. In other words, the breaking of the metal crosslinking easily occurs at the core central part, but less occurs toward the surface. As a result, it is conceivable that since a crosslinking density in the core increases from the center of the core toward the surface thereof, the core hardness increases linearly or almost linearly from the center of the core toward the surface thereof.

The rubber composition used in the present invention preferably contains (f) an organic sulfur compound. In general, if the degree of outer-hard and inner-soft structure of the core increases, the resilience lowers. However, in the present invention, use of (d) the carboxylic acid and (f) the organic sulfur compound in combination further improves the resilience of the core, as well as allows the core to have the hardness distribution where the hardness increases linearly or almost linearly, with the high degree of the outer-hard and inner-soft structure. In particular, if compared at the same compression deformation amount, the golf ball of the present invention has higher resilience than the golf ball using only (f) the organic sulfur compound without (d) the carboxylic acid. Use of (d) the salt of the carboxylic acid and (f) the organic sulfur compound in combination allows to control a slope of the core hardness distribution and further enhance a degree of the outer-hard and inner-soft structure.

According to the present invention, it is possible to provide a golf ball excellent in flying performance, in particular, to provide a golf ball traveling a great flight distance.

DESCRIPTION OF THE PREFERRED EMBODIMENT

Figure 1:
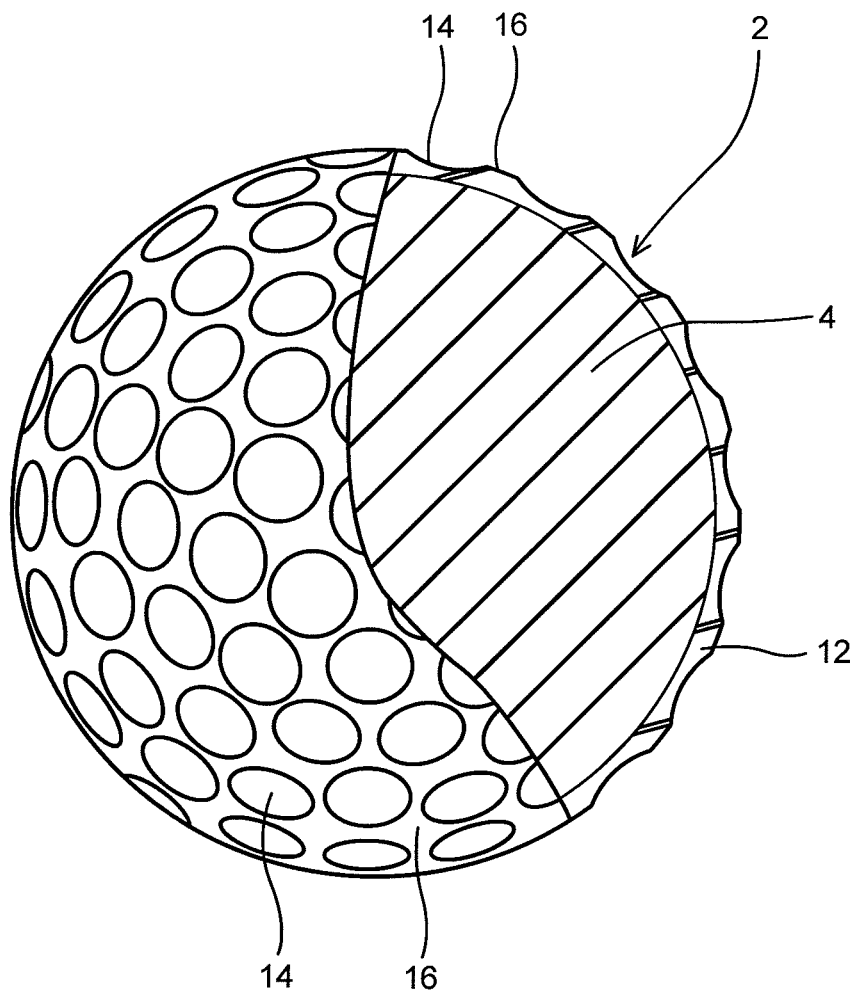
FIG. 1 is a partially cutaway view of the golf ball of the preferred embodiment of the present invention.

The present invention provides a golf ball comprising a spherical core and at least one cover layer, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a carboxylic acid or a salt thereof, provided that the rubber composition further contains (e) a metal compound in the case of containing only (b) the α,β-unsaturated carboxylic acid having 3 to 8 carbon atoms as the co-crosslinking initiator.

First, (a) the base rubber used in the present invention will be explained. As (a) the base rubber used in the present invention, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Among them, typically preferred is the high cis-polybutadiene having a cis-1,4 bond in a proportion of 40% or more, more preferably 80% or more, even more preferably 90% or more in view of its superior resilience property.

The high-cis polybutadiene preferably has a 1,2-vinyl bond in a content of 2 mass % or less, more preferably 1.7 mass % or less, and even more preferably 1.5 mass % or less. If the content of 1,2-vinyl bond is excessively high, the resilience may be lowered.

The high-cis polybutadiene is preferably one synthesized using a rare earth element catalyst. When a neodymium catalyst, which employs a neodymium compound which is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of column: GMHHXL (manufactured by Tosoh Corporation), column temperature: 40° C., and mobile phase: tetrahydrofuran, and calculated by converting based on polystyrene standard.

Next, (b) the α,β-unsaturated carboxylic acid having 3 to 8 carbon atoms and/or a metal salt thereof will be explained. (b) The α,β-unsaturated carboxylic acid having 3 to 8 carbon atoms and/or a metal salt thereof is blended as a co-crosslinking agent in the rubber composition and has an action of crosslinking a rubber molecule by graft polymerization to a base rubber molecular chain. In the case that the rubber composition used in the present invention contains only the α,β-unsaturated carboxylic acid having 3 to 8 carbon atoms as the co-crosslinking agent, the rubber composition further contains (e) a metal compound as an essential component. Neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms. Further, in the case of using the α,β-unsaturated carboxylic acid having 3 to 8 carbon atoms and the metal salt thereof in combination, (e) the metal compound may be used as an optional component.

The α,β-unsaturated carboxylic acid having 3 to 8 carbon atoms includes, for example, acrylic acid, methacrylic acid, fumaric acid, maleic acid, crotonic acid, and the like.

Examples of the metals constituting the metal salts of the α,β-unsaturated carboxylic acid having 3 to 8 carbon atoms include: monovalent metal ions such as sodium, potassium, lithium or the like; divalent metal ions such as magnesium, calcium, zinc, barium, cadmium or the like; trivalent metal ions such as aluminum ion or the like; and other metal ions such as tin, zirconium or the like. The above metal ions can be used solely or as a mixture of at least two of them. Among these metal ions, divalent metal ions such as magnesium, calcium, zinc, barium, cadmium or the like are preferable. Use of the divalent metal salts of the α,β-unsaturated carboxylic acid having 3 to 8 carbon atoms easily generates a metal crosslinking between the rubber molecules. Especially, as the divalent metal sat, zinc acrylate is preferable, because zinc acrylate enhances the resilience of the resultant golf ball. The α,β-unsaturated carboxylic acid having 3 to 8 carbon atoms and/or a metal salt thereof may be used solely or in combination at least two of them.

The content of (b) the α,β-unsaturated carboxylic acid having 3 to 8 carbon atoms and/or the metal salt thereof is preferably 15 parts by mass or more, more preferably 20 parts by mass or more, and is preferably 50 parts by mass or less, more preferably 45 parts by mass or less, even more preferably 35 parts by mass or less, with respect to 100 parts by mass of (a) the base rubber. If the content of (b) the α,β-unsaturated carboxylic acid having 3 to 8 carbon atoms and/or the metal salt thereof is less than 15 parts by mass, the content of (c) the crosslinking initiator which will be explained below must be increased in order to obtain the appropriate hardness of the constituting member formed from the rubber composition, which tends to cause the lower resilience. On the other hand, if the content of (b) the α,β-unsaturated carboxylic acid having 3 to 8 carbon atoms and/or the metal salt thereof exceeds 50 parts by mass, the constituting member formed from the rubber composition becomes excessively hard, which tends to cause the lower shot feeling.

(c) The crosslinking initiator is blended in order to crosslink (a) the base rubber component. As (c) the crosslinking initiator, an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxides may be used solely or two or more of these organic peroxides may be used in combination. Among them, dicumyl peroxide is preferably used.

The content of (c) the crosslinking initiator is preferably 0.2 part by mass or more, and more preferably 0.5 part by mass or more, and is preferably 5.0 parts by mass or less, and more preferably 2.5 parts by mass or less, with respect to 100 parts by mass of (a) the base rubber. If the content of (c) the crosslinking initiator is less than 0.2 part by mass, the constituting member formed from the rubber composition becomes too soft, and thus the golf ball may have the lower resilience. If the content of (c) the crosslinking initiator exceeds 5.0 parts by mass, the amount of (b) the co-crosslinking agent must be decreased in order to obtain the appropriate hardness of the constituting member formed from the rubber composition, resulting in the insufficient resilience and lower durability of the golf ball.

(d) The carboxylic acid or a salt thereof used in the present invention will be explained. Although (d) the carboxylic acid or a salt thereof used in the present invention is not limited as long as it is a compound having a carboxylic group or a salt thereof, (b) the α,β-unsaturated carboxylic acid having 3 to 8 carbon atoms or a metal salt thereof used as a co-crosslinking agent should not be included. It is though that (d) the carboxylic acid or a salt thereof has an action of breaking the metal crosslinking by the metal salt of (b) the α,β-unsaturated carboxylic acid having 3 to 8 carbon atoms, in the center part of the core, when molding the core.

(d) The carboxylic acid or a salt thereof may include any one of an aliphatic carboxylic acid (sometimes may be merely referred to as "fatty acid" in the present invention) or a salt of the aliphatic carboxylic acid and (d1) an aromatic carboxylic acid or (d2) a salt of the aromatic carboxylic acid, as long as it exchanges the cation component with the metal salt of the α,β-unsaturated carboxylic acid having 3 to 8 carbon atoms. The carboxylic acid preferably includes a carboxylic acid having 4 to 30 carbon atoms, more preferably a carboxylic acid having 9 to 30 carbon atoms, even more preferably a carboxylic acid having 14 to 28 carbon atoms.

The fatty acid may be either a saturated fatty acid or an unsaturated fatty acid; however, a saturated fatty acid is preferable. Specific examples of the saturated fatty acids (IUPAC name) are butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecnoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), triacontanoic acid (C30).

Specific examples of the unsaturated fatty acid (IUPAC name) are butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), penacosenoic acid (C25), hexacosenoic acid (C26), heptacosenoic acid (C27), octacosenoic acid (C28), nonacosenoic acid (C29), triacontenoic acid (C30).

Specific examples of the fatty acid (Common name) are, butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). The fatty acid may be used alone or as a mixture of at least two of them. Among those described above, capric acid, myristic acid, palmitic acid, setaric acid, behenic acid and oleic acid are preferable as the fatty acid.

There is no particular limitation on the aromatic carboxylic acid, as long as it is a compound that has an aromatic ring and a carboxyl group. Specific examples of the aromatic carboxylic acid include, for example, benzoic acid (C7), phthalic acid (C8), isophthalic acid (C8), terephthalic acid (C8), hemimellitic acid (benzene-1,2,3-tricarboxylic acid) (C9), trimellitic acid (benzene-1,2,4-tricarboxylic acid) (C9), trimesic acid (benzene-1,3,5-tricarboxylic acid) (C9), mellophanic acid (benzene-1,2,3,4-tetracarboxylic acid) (C10), prehnitic acid (benzene-1,2,3,5-tetracarboxylic acid)

(C10), pyromellitic acid (benzene-1,2,4,5-tetracarboxylic acid) (C10), mellitic acid (benzene hexacarboxylic acid) (C12), diphenic acid (biphenyl-2,2'-dicarboxylic acid) (C12), toluic acid (methylbenzoic acid) (C8), xylic acid (C9), prehnitylic acid (2,3,4-trimethylbenzoic acid) (C10), γ-isodurylic acid (2,3,5-trimethylbenzoic acid) (C10), durylic acid (2,4,5-trimethylbenzoic acid) (C10), β-isodurylic acid (2,4,6-trimethylbenzoic acid) (C10), α-isodurylic acid (3,4,5-trimethylbenzoic acid) (C10), cuminic acid (4-isopropylbenzoic acid) (C10), uvitic acid (5-methylisophthalic acid) (C9), α-toluic acid (phenylacetic acid) (C8), hydratropic acid (2-phenylpropanoic acid) (C9), and hydrocinnamic acid (3-phenylpropanoic acid) (C9).

Furthermore, examples of the aromatic carboxylic acid substituted with a hydroxyl group, an alkoxy group, or an oxo group include, for example, salicylic acid (2-hydroxybenzoic acid) (C7), anisic acid (methoxybenzoic acid) (C8), cresotinic acid (hydroxy (methyl) benzoic acid) (C8), o-homosalicylic acid (2-hydroxy-3-methylbenzoic acid) (C8), m-homosalicylic acid (2-hydroxy-4-methylbenzoic acid) (C8), p-homosalicylic acid (2-hydroxy-5-methylbenzoic acid) (C8), o-pyrocatechuic acid (2,3-dihydroxybenzoic acid) (C7), β-resorcylic acid (2,4-dihydroxybenzoic acid) (C7), γ-resorcylic acid (2,6-dihydroxybenzoic acid) (C7), protocatechuic acid (3,4-dihydroxybenzoic acid) (C7), α-resorcylic acid (3,5-dihydroxybenzoic acid) (C7), vanillic acid (4-hydroxy-3-methoxybenzoic acid) (C8), isovanillic acid (3-hydroxy-4-methoxybenzoic acid) (C8), veratric acid (3,4-dimethoxybenzoic acid) (C9), o-veratric acid (2,3-dimethoxybenzoic acid) (C9), orsellinic acid (2,4-dihydroxy-6-methylbenzoic acid) (C8), m-hemipinic acid (4,5-dimethoxyphthalic acid) (C10), gallic acid (3,4,5-trihydroxybenzoic acid) (C7), syringic acid (4-hydroxy-3,5-dimethoxybenzoic acid) (C9), asaronic acid (2,4,5-trimethoxybenzoic acid) (C10), mandelic acid (hydroxy (phenyl) acetic acid) (C8), vanilmandelic acid (hydroxy (4-hydroxy-3-methoxy phenyl) acetic acid) (C9), homoanisic acid ((4-methoxy phenyl) acetic acid) (C9), homogentisic acid ((2,5-dihydroxyphenyl) acetic acid) (C8), homoprotocatechuic acid ((3,4-dihydroxyphenyl) acetic acid) (C8), homovanillic acid ((4-hydroxy-3-methoxy phenyl) acetic acid) (C9), homoisovanillic acid ((3-hydroxy-4-methoxy phenyl) acetic acid) (C9), homoveratric acid ((3,4-dimethoxy phenyl) acetic acid) (C10), o-homoveratric acid ((2,3-dimethoxy phenyl) acetic acid) (C10), homophthalic acid (2-(carboxymethyl) benzoic acid) (C9), homoisophthalic acid (3-(carboxymethyl) benzoic acid) (C9), homoterephthalic acid (4-(carboxymethyl) benzoic acid) (C9), phthalonic acid (2-(carboxycarbonyl) benzoic acid) (C9), isophthalonic acid (3-(carboxycarbonyl) benzoic acid) (C9), terephthalonic acid (4-(carboxycarbonyl) benzoic acid) (C9), benzilic acid (hydroxy diphenylacetic acid) (C14), atrolactic acid (2-hydroxy-2-phenylpropanoic acid) (C9), tropic acid (3-hydroxy-2-phenylpropanoic acid) (C9), melilotic acid (3-(2-hydroxyphenyl) propanoic acid) (C9), phloretic acid (3-(4-hydroxy phenyl) propanoic acid) (C9), hydrocaffeic acid (3-(3,4-dihydroxyphenyl) propanoic acid) (C9), hydroferulic acid (3-(4-hydroxy-3-methoxy phenyl) propanoic acid) (C10), hydroisoferulic acid (3-(3-hydroxy-4-methoxy phenyl) propanoic acid) (C10), p-coumaric acid (3-(4-hydroxy phenyl) acrylic acid) (C9), umbellic acid (3-(2,4-dihydroxyphenyl) acrylic acid) (C9), caffeic acid (3-(3,4-dihydroxyphenyl) acrylic acid) (C9), ferulic acid (3-(4-hydroxy-3-methoxy phenyl) acrylic acid) (C10), isoferulic acid (3-(3-hydroxy-4-methoxy phenyl) acrylic acid) (C10), and sinapic acid (3-(4-hydroxy-3,5-dimethoxy phenyl) acrylic acid) (C11).

Examples of the salt of the carboxylic acid are the salts of the carboxylic acids describe above. The cation component of the salt of the carboxylic acid may be any one of a metal ion, an ammonium ion and an organic cation. The metal ion includes monovalent metal ions such as sodium, potassium, lithium, silver, and the like; bivalent metal ions such as magnesium, calcium, zinc, barium, cadmium, copper, cobalt, nickel, manganese, and the like; trivalent metal ions such as aluminum and iron, and other ions such as tin, zirconium, titanium, and the like. These cation components may be used alone or a mixture of at least two of them.

The organic cation includes a cation having a carbon chain. The organic cation includes, for example, without limitation, an organic ammonium ion. Examples of the organic ammonium ion are: primary ammonium ions such as stearyl ammonium ion, hexyl ammonium ion, octyl ammonium ion, 2-ethyl hexyl ammonium ion, or the like; secondary ammonium ions such as dodecyl (lauryl) ammonium ion, octadecyl (stearyl) ammonium ion, or the like; tertiary ammonium ions such as trioctyl ammonium ion, or the like; and quaternary ammonium ion such as dioctyldimethyl ammonium ion, distearyldimethyl ammonium ion, or the like. These organic cation may be used alone or a mixture of at least two of them. The content of (d) the carboxylic acid is preferably 5 parts by mass or more, more preferably 7.5 parts by mass or more, even more preferably 10 parts by mass or more, and is preferably 40 parts by mass or less, more preferably 20 parts by mass or less, even more preferably 16 parts by mass or less. If the content is less than 5 parts by mass, the effect of adding (d) the carboxylic acid is not sufficient, and thus the linearity of the core hardness distribution may be lowered. If the content is more than 40 parts by mass, the resilience of the core may be lowered, since the hardness of the resultant core may be lowered as a whole.

The content of (d) the salt of the carboxylic acid is preferably 10 parts by mass or more, more preferably 12 parts by mass or more, and is preferably less than 40 parts by mass, more preferably 30 parts by mass or less, even more preferably 25 parts by mass or less. If the content of (d) the salt of the carboxylic acid is less than 10 parts by mass, the effect of adding (d) the salt of the carboxylic acid is not sufficient, and thus the linearity of the core hardness distribution may be lowered. If the content is 40 parts by mass or more, the resilience of the core may be lowered, since the hardness of the resultant core may be lowered as a whole.

There are cases where the surface of the zinc acrylate used as the co-crosslinking agent is treated with the carboxylic acid having 4 to 30 carbon atoms or a salt thereof to improve the dispersibility to the rubber. In the case of using zinc acrylate whose surface is treated with the carboxylic acid having 4 to 30 carbon atoms or a salt thereof, in the present invention, the amount of the carboxylic acid having 4 to 30 carbon atoms or a salt thereof used as a surface treating agent is included in the content of (d) the carboxylic acid or a salt thereof. For example, if 25 parts by mass of zinc acrylate containing the carboxylic acid having 4 to 30 carbon atoms or a salt thereof in a surface treatment amount of 10 mass % is used, the amount of the carboxylic acid having 4 to 30 carbon atoms or a salt thereof is 2.5 parts by mass and the amount of zinc acrylate is 22.5 parts by mass. Thus, 2.5 parts by mass is counted as the content of (d) the carboxylic acid or a salt thereof.

In the case that the rubber composition used in the present invention contains only the α,β-unsaturated carboxylic acid having 3 to 8 carbon atoms as the co-crosslinking agent, the rubber composition further contains (e) a metal compound as an essential component. (e) The metal compound is not limited as long as it can neutralize (b) the α,β-unsaturated carboxylic acid having 3 to 8 carbon atoms in the rubber composition. (e) The metal compound includes, for example, metal hydroxides such as magnesium hydroxide, zinc hydroxide, calcium hydroxide, sodium hydroxide, lithium hydroxide, potassium hydroxide, copper hydroxide, and the like; metal oxides such as magnesium oxide, calcium oxide, zinc oxide, copper oxide, and the like; metal carbonates such as magnesium carbonate, zinc carbonate, calcium carbonate, sodium carbonate, lithium carbonate, potassium carbonate, and the like. Among these, (e) the metal compound preferably includes a divalent metal compound, more preferably includes a zinc compound. The divalent metal compound reacts with the α,β-unsaturated carboxylic acid having 3 to 8 carbon atoms, thereby forming a metal crosslinking. Use of the zinc compound provides a golf ball with excellent resilience. (e) These metal compounds are used solely or as a mixture of at least two of them.

(f) The organic sulfur compound will be described next. In the present invention, by using (f) the organic sulfur compound and (d) the carboxylic acid or a salt thereof in combination for the core rubber composition, the degree of the outer-hard and inner-soft structure of the core can be controlled, while maintaining approximate linearity of the core hardness distribution. (f) The organic sulfur compound is not particularly limited, as long as it is an organic compound having a sulfur atom in the molecule thereof. Examples thereof include an organic compound having a thiol group (—SH), a polysulfide bond having 2 to 4 sulfur atoms (—S—S—, —S—S—S—, or —S—S—S—S—), or a metal salt thereof (—SM, —S-M-S—, —S-M-S—S—, —S—S-M-S—S—, —S-M-S—S—S—, or the like; M is a metal atom). Furthermore, (f) the organic sulfur compound may be any one of aliphatic compounds (aliphatic thiol, aliphatic thiocarboxylic acid, aliphatic dithiocarboxylic acid, aliphatic polysulfides, or the like), heterocyclic compounds, alicyclic compounds (alicyclic thiol, alicyclic thiocarboxylic acid, alicyclic dithiocarboxylic acid, alicyclic polysulfides, or the like), and aromatic compounds. (f) The organic sulfur compound includes, for example, thiophenols, thionaphthols, polysulfides, thiocarboxylic acids, dithiocarboxylic acids, sulfenamides, thiurams, dithiocarbamates, and thiazoles. From the aspect of the larger hardness distribution of the core, (f) the organic sulfur compound preferably includes, organic compounds having a thiol group (—SH) or a metal salt thereof, more preferably thiophenols, thionaphthols, or a metal salt thereof. Examples of the metal salts are salts of monovalent metals such as sodium, lithium, potassium, copper (I), and silver (I), and salts of divalent metals such as zinc, magnesium, calcium, strontium, barium, titanium (II), manganese (II), iron (II), cobalt (II), nickel(II), zirconium(II), and tin (II).

Specific examples of (f) the organic sulfur compound are the organic sulfur compounds described in the following formulae (1) to (4).

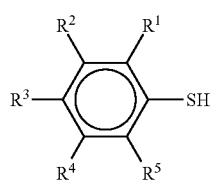

(1)

(wherein $R^1$ to $R^5$ each independently represent H or a substituent group)

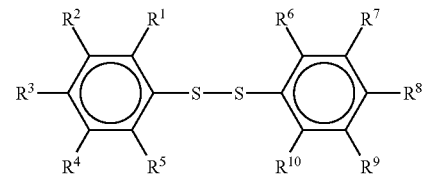

(2)

(wherein $R^1$ to $R^{10}$ each independently represent H or a substituent group)

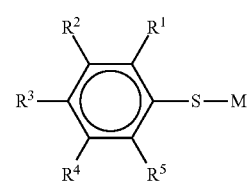

(3)

(wherein $R^1$ to $R^5$ each independently represent H or a substituent group, and M represents a monovalent metal atom)

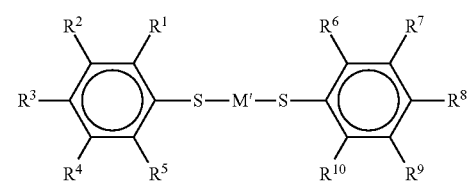

(4)

(wherein $R^1$ to $R^{10}$ each independently represent H or a substituent group, and M' represents a bivalent metal atom)

In the above formulae (1) to (4), the substituent group is at least one selected from the group consisting of halogen groups (F, Cl, Br, I), an alkyl group, a carboxyl group (—COOH) or an ester thereof (—COOR), a formyl group (—CHO), an acyl group (—COR), a halogenated carbonyl group (—COX), a sulfo group (—SO$_3$H) or an ester thereof (—SO$_3$R), a halogenated sulfonyl group (—SO$_2$X), a sulfino group (—SO$_2$H), an alkylsulfinyl group (—SOR), a carbamoyl group (—CONH$_2$), a halogenated alkyl group, a cyano group (—CN), and an alkoxy group (—OR).

Examples of the organic sulfur compounds represented by the formula (1) include thiophenol; and compounds substituted with one kind of a substituent group, such as thiophenols substituted with a halogen group, such as 4-fluorothiophenol, 2,5-difluorothiophenol, 2,4,5-trifluorothiophenol, 2,4,5,6-tetrafluorothiophenol, pentafluorothiophenol, 2-chlorothiophenol, 4-chlorothiophenol, 2,4-dichlorothiopheno, 2,5-dichlorothiophenol, 2,4,5-trichlorothiophenol, 2,4,5,6-tetrachlorothiophenol, pentachlorothiophenol, 4-bromothiophenol, 2,5-dibromothiophenol, 2,4,5-tribromothiophenol, 2,4,5,6-tetrabromothiophenol, pentabromothiophenol, 4-iodothiophenol, 2,5-diiodothiophenol, 2,4,5-triiodothiophenol, 2,4,5,6-tetraiodothiophenol, pentaiodothiophenol; thiophenols substituted with an alkyl group, such as 4-methylthiophenol, 2,4,5-trimethylthiophenol, pentamethylthiophenol, 4-t-butylthiophenol, 2,4,5-tri-t-butylthiophenol, penta-t-butylthiophenol; thiophenols substituted with a carboxyl group, such as 4-carboxythiophenol, 2,4,6-tricarboxythiophenol, pentacarboxythiophenol; thiophenols substituted with an alkoxycarbonyl group, such as 4-methoxycarbonylthiophenol, 2,4,6-trimethoxycarbonylthiophenol, pentamethoxycarbonylthiophenol; thiophenols substituted with a formyl group, such as 4-formylthiophenol, 2,4,6-triformylthiophenol, pentaformylthiophenol; thiophenols substituted with an acyl group, such as 4-acetylthiophenol, 2,4,6-triacetylthiophenol, pentaacetylthiophenol; thiophenols substituted with a halogenated carbonyl group, such as 4-chlorocarbonylthiophenol, 2,4,6-tri(chlorocarbonyl)thiophenol, penta(chlorocarbonyl)thiophenol; thiophenols substituted with a sulfo group, such as 4-sulfothiophenol, 2,4,6-trisulfothiophenol, pentasulfothiophenol; thiophenols substituted with an alkoxysulfonyl group, such as 4-methoxysulfonylthiophenol, 2,4,6-trimethoxysulfonylthiophenol, pentamethoxysulfonylthiophenol; thiophenols substituted with a halogenated sulfonyl group, such as 4-chlorosulfonylthiophenol, 2,4,6-tri(chlorosulfonyl)thiophenol, penta(chlorosulfonyl)thiophenol; thiophenols substituted with a sulfino group, such as 4-sulfinothiophenol, 2,4,6-trisulfinothiophenol, pentasulfinothiophenol; thiophenols substituted with an alkylsulfinyl group, such as 4-methylsulfinylthiophenol, 2,4,6-tri(methylsulfinyl)thiophenol, penta(methylsulfinyl)thiophenol; thiophenols substituted with a carbamoyl group, such as 4-carbamoylthiophenol, 2,4,6-tricarbamoylthiophenol, pentacarbamoylthiophenol; thiophenols substituted with a halogenated alkyl group, such as 4-trichloromethylthiophenol, 2,4,6-tri(trichloromethyl) thiophenol, penta(trichloromethyl)thiophenol; thiophenols substituted with cyano group, such as 4-cyanothiophenol, 2,4,6-tricyanothiophenol, pentacyanothiophenol; thiophenols substituted with alkoxy group, such as 4-methoxythiophenol, 2,4,6-trimethoxythiophenol, pentamethoxythiophenol; and the like.

The organic sulfur compounds represented by the formula (1) include compounds substituted with another substituent group, such as a nitro group (—NO$_2$), an amino group (—NH$_2$), a hydroxyl group (—OH) and a phenylthio group (—SPh) in addition to at least one of one kind of the substituent group described above. Examples thereof include 4-chloro-2-nitrothiophenol, 4-chloro-2-aminothiophenol, 4-chloro-2-hydroxythiophenol, 4-chloro-2-phenylthiothiophenol, 4-methyl-2-nitrothiophenol, 4-methyl-2-aminothiophenol, 4-methyl-2-hydroxythiophenol, 4-methyl-2-phenylthiothiophenol, 4-carboxy-2-nitrothiophenol, 4-carboxy-2-aminothiophenol, 4-carboxy-2-hydroxythiophenol, 4-carboxy-2-phenylthiothiophenol, 4-methoxycarbonyl-2-nitrothiophenol, 4-methoxycarbonyl-2-aminothiophenol, 4-methoxycarbonyl-2-hydroxythiophenol, 4-methoxycarbonyl-2-phenylthiothiophenol, 4-formyl-2-nitrothiophenol, 4-formyl-2-aminothiophenol, 4-formyl-2-hydroxythiophenol, 4-formyl-2-phenylthiothiophenol, 4-acetyl-2-nitrothiophenol, 4-acetyl-2-aminothiophenol, 4-acetyl-2-hydroxythiophenol, 4-acetyl-2-phenylthiothiophenol, 4-chlorocarbonyl-2-nitrothiophenol, 4-chlorocarbonyl-2-aminothiophenol, 4-chlorocarbonyl-2-hydroxythiophenol, 4-chlorocarbonyl-2-phenylthiothiophenol, 4-sulfo-2-nitrothiophenol, 4-sulfo-2-aminothiophenol, 4-sulfo-2-hydroxythiophenol, 4-sulfo-2-phenylthiothiophenol, 4-methoxysulfonyl-2-nitrothiophenol, 4-methoxysulfonyl-2-aminothiophenol, 4-methoxysulfonyl-2-hydroxythiophenol, 4-methoxysulfonyl-2-phenylthiothiophenol, 4-chlorosulfonyl-2-nitrothiophenol, 4-chlorosulfonyl-2-aminothiophenol, 4-chlorosulfonyl-2-hydroxythiophenol, 4-chlorosulfonyl-2-phenylthiothiophenol, 4-sulfino-2-nitrothiophenol, 4-sulfino-2-aminothiophenol, 4-sulfino-2-hydroxythiophenol, 4-sulfino-2-phenylthiothiophenol, 4-methylsulfinyl-2-nitrothiophenol, 4-methylsulfinyl-2-aminothiophenol, 4-methylsulfinyl-2-hydroxythiophenol, 4-methylsulfinyl-2-phenylthiothiophenol, 4-carbamoyl-2-nitrothiophenol, 4-carbamoyl-2-aminothiophenol, 4-carbamoyl-2-hydroxythiophenol, 4-carbamoyl-2-phenylthiothiophenol, 4-trichloromethyl-2-nitrothiophenol, 4-trichloromethyl-2-aminothiophenol, 4-trichloromethyl-2-hydroxythiophenol, 4-trichloromethyl-2-phenylthiothiophenol, 4-cyano-2-nitrothiophenol, 4-cyano-2-aminothiophenol, 4-cyano-2-hydroxythiophenol, 4-cyano-2-phenylthiothiophenol, 4-methoxy-2-nitrothiophenol, 4-methoxy-2-aminothiophenol, 4-methoxy-2-hydroxythiophenol, 4-methoxy-2-phenylthiothiophenol and the like.

The organic sulfur compounds represented by the formula (1) include compounds substituted with two or more of the substituent groups described above. Examples thereof include 4-acetyl-2-chlorothiophenol, 4-acetyl-2-methylthiophenol, 4-acetyl-2-carboxythiophenol, 4-acetyl-2-methoxycarbonylthiophenol, 4-acetyl-2-formylthiophenol, 4-acetyl-2-chlorocarbonylthiophenol, 4-acetyl-2-sulfothiophenol, 4-acetyl-2-methoxysulfonylthiophenol, 4-acetyl-2-chlorosulfonylthiophenol, 4-acetyl-2-sulfinothiophenol, 4-acetyl-2-methylsulfinylthiophenol, 4-acetyl-2-carbamoylthiophenol, 4-acetyl-2-trichloromethylthiophenol, 4-acetyl-2-cyanothiophenol, 4-acetyl-2-methoxythiophenol and the like.

Examples of the organic sulfur compounds represented by the formula (2) include diphenyldisulfide; and compounds substituted with one kind of a substituent group, such as diphenyldisulfides substituted with a halogen group, such as bis(4-fluorophenyl)disulfide, bis(2,5-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,4,5-triiodophenyl)disulfide, bis(2,4,5,6-tetraiodophenyl) disulfide, bis(pentaiodophenyl)disulfide; diphenyldisulfides substituted with an alkyl group, such as bis(4-methylphenyl) disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, bis(penta-t-butylphenyl) disulfide; diphenyldisulfides substituted with a carboxyl group, such as bis(4-carboxyphenyl)disulfide, bis(2,4,6-tricarboxyphenyl)disulfide, bis(pentacarboxyphenyl)disulfide; diphenyldisulfides substituted with an alkoxycarbonyl group, such as bis(4-methoxycarbonylphenyl)disulfide, bis (2,4,6-trimethoxycarbonylphenyl)disulfide, bis(pentamethoxycarbonylphenyl)disulfide; diphenyldisulfides substituted with a formyl group, such as bis(4-formylphenyl) disulfide, bis(2,4,6-triformylphenyl)disulfide, bis (pentaformylphenyl)disulfide; diphenyldisulfides substituted with an acyl group, such as bis(4-acetylphenyl) disulfide, bis(2,4,6-triacetylphenyl)disulfide, bis(pentaacetylphenyl)disulfide; diphenyldisulfides substituted with a halogenated carbonyl group, such as bis(4-chlorocarbonylphenyl)disulfide, bis(2,4,6-tri(chlorocarbonyl)phenyl) disulfide, bis(penta(chlorocarbonyl)phenyl)disulfide; diphenyldisulfides substituted with a sulfo group, such as bis(4-sulfophenyl)disulfide, bis(2,4,6-trisulfophenyl)disulfide, bis (pentasulfophenyl)disulfide; diphenyldisulfides substituted with an alkoxysulfonyl group, such as bis(4-methoxysulfonylphenyl)disulfide, bis(2,4,6-trimethoxysulfonylphenyl)disulfide, bis(pentamethoxysulfonylphenyl)disulfide; diphenyldisulfides substituted with a halogenated sulfonyl group, such as bis(4-chlorosulfonylphenyl)disulfide, bis(2,4,6-tri(chlorosulfonyl)phenyl)disulfide, bis(penta(chlorosulfonyl)phenyl)disulfide; diphenyldisulfides substituted with a sulfino group, such as bis(4-sulfinophenyl)disulfide, bis(2,4,6-trisulfinophenyl)disulfide, bis(pentasulfinophenyl)disulfide; diphenyldisulfides substituted with an alkylsulfinyl group, such as bis(4-methylsulfinylphenyl)disulfide, bis(2,4,6-tri(methylsulfinyl)phenyl)disulfide, bis(penta(methylsulfinyl)phenyl)disulfide; diphenyldisulfides substituted with a carbamoyl group, such as bis(4-carbamoylphenyl)disulfide, bis(2,4,6-tricarbamoylphenyl)disulfide, bis(pentacarbamoylphenyl)disulfide; diphenyldisulfides substituted with a halogenated alkyl group, such as bis(4-trichloromethylphenyl)disulfide, bis(2,4,6-tri(trichloromethyl)phenyl)disulfide, bis(penta(trichloromethyl)phenyl)disulfide; diphenyldisulfides substituted with a cyano group, such as bis(4-cyanophenyl)disulfide, bis(2,4,6-tricyanophenyl)disulfide, bis(pentacyanophenyl)disulfide; diphenyldisulfides substituted with an alkoxy group, such as bis(4-methoxyphenyl)disulfide, bis(2,4,6-trimethoxyphenyl)disulfide, bis(pentamethoxyphenyl)disulfide; and the like.

The organic sulfur compounds represented by the formula (2) include compounds substituted with another substituent group, such as nitro group (—NO$_2$), amino group (—NH$_2$), hydroxyl group (—OH) and phenylthio group (—SPh) in addition to at least one of one kind of the substituent group described above. Examples thereof include bis(4-chloro-2-nitrophenyl)disulfide, bis(4-chloro-2-aminophenyl)disulfide, bis(4-chloro-2-hydroxyphenyl)disulfide, bis(4-chloro-2-phenylthiophenyl)disulfide, bis(4-methyl-2-nitrophenyl)disulfide, bis(4-methyl-2-aminophenyl)disulfide, bis(4-methyl-2-hydroxyphenyl)disulfide, bis(4-methyl-2-phenylthiophenyl)disulfide, bis(4-carboxy-2-nitrophenyl)disulfide, bis(4-carboxy-2-aminophenyl)disulfide, bis(4-carboxy-2-hydroxyphenyl)disulfide, bis(4-carboxy-2-phenylthiophenyl)disulfide, bis(4-methoxycarbonyl-2-nitrophenyl)disulfide, bis(4-methoxycarbonyl-2-aminophenyl)disulfide, bis(4-methoxycarbonyl-2-hydroxyphenyl)disulfide, bis(4-methoxycarbonyl-2-phenylthiophenyl)disulfide, bis(4-formyl-2-nitrophenyl)disulfide, bis(4-formyl-2-aminophenyl)disulfide, bis(4-formyl-2-hydroxyphenyl)disulfide, bis(4-formyl-2-phenylthiophenyl)disulfide, bis(4-acetyl-2-nitrophenyl)disulfide, bis(4-acetyl-2-aminophenyl)disulfide, bis(4-acetyl-2-hydroxyphenyl)disulfide, bis(4-acetyl-2-phenylthiophenyl)disulfide, bis(4-chlorocarbonyl-2-nitrophenyl)disulfide, bis(4-chlorocarbonyl-2-aminophenyl)disulfide, bis(4-chlorocarbonyl-2-hydroxyphenyl)disulfide, bis(4-chlorocarbonyl-2-phenylthiophenyl)disulfide, bis(4-sulfo-2-nitrophenyl)disulfide, bis(4-sulfo-2-aminophenyl)disulfide, bis(4-sulfo-2-hydroxyphenyl)disulfide, bis(4-sulfo-2-phenylthiophenyl)disulfide, bis(4-methoxysulfonyl-2-nitrophenyl)disulfide, bis(4-methoxysulfonyl-2-aminophenyl)disulfide, bis(4-methoxysulfonyl-2-hydroxyphenyl)disulfide, bis(4-methoxysulfonyl-2-phenylthiophenyl)disulfide, bis(4-chlorosulfonyl-2-nitrophenyl)disulfide, bis(4-chlorosulfonyl-2-aminophenyl)disulfide, bis(4-chlorosulfonyl-2-hydroxyphenyl)disulfide, bis(4-chlorosulfonyl-2-phenylthiophenyl)disulfide, bis(4-sulfino-2-nitrophenyl)disulfide, bis(4-sulfino-2-aminophenyl)disulfide, bis(4-sulfino-2-hydroxyphenyl)disulfide, bis(4-sulfino-2-phenylthiophenyl)disulfide, bis(4-methylsulfinyl-2-nitrophenyl)disulfide, bis(4-methylsulfinyl-2-aminophenyl)disulfide, bis(4-methylsulfinyl-2-hydroxyphenyl)disulfide, bis(4-methylsulfinyl-2-phenylthiophenyl)disulfide, bis(4-carbamoyl-2-nitrophenyl)disulfide, bis(4-carbamoyl-2-aminophenyl)disulfide, bis(4-carbamoyl-2-hydroxyphenyl)disulfide, bis(4-carbamoyl-2-phenylthiophenyl)disulfide, bis(4-trichloromethyl-2-nitrophenyl)disulfide, bis(4-trichloromethyl-2-aminophenyl)disulfide, bis(4-trichloromethyl-2-hydroxyphenyl)disulfide, bis(4-trichloromethyl-2-phenylthiophenyl)disulfide, bis(4-cyano-2-nitrophenyl)disulfide, bis(4-cyano-2-aminophenyl)disulfide, bis(4-cyano-2-hydroxyphenyl)disulfide, bis(4-cyano-2-phenylthiophenyl)disulfide, bis(4-methoxy-2-nitrophenyl)disulfide, bis(4-methoxy-2-aminophenyl)disulfide, bis(4-methoxy-2-hydroxyphenyl)disulfide, bis(4-methoxy-2-phenylthiophenyl)disulfide and the like.

The organic sulfur compounds represented by the formula (2) include compounds substituted with two or more of the substituent groups described above. Examples thereof include bis(4-acetyl-2-chlorophenyl)disulfide, bis(4-acetyl-2-methylphenyl)disulfide, bis(4-acetyl-2-carboxyphenyl)disulfide, bis(4-acetyl-2-methoxycarbonylphenyl)disulfide, bis(4-acetyl-2-formylphenyl)disulfide, bis(4-acetyl-2-chlorocarbonylphenyl)disulfide, bis(4-acetyl-2-sulfophenyl)disulfide, bis(4-acetyl-2-methoxysulfonylphenyl)disulfide, bis(4-acetyl-2-chlorosulfonylphenyl)disulfide, bis(4-acetyl-2-sulfinophenyl)disulfide, bis(4-acetyl-2-methylsulfinylphenyl)disulfide, bis(4-acetyl-2-carbamoylphenyl)disulfide, bis(4-acetyl-2-trichloromethylphenyl)disulfide, bis(4-acetyl-2-cyanophenyl)disulfide, bis(4-acetyl-2-methoxyphenyl)disulfide and the like.

Examples of the organic sulfur compounds represented by the formula (3) include thiophenol sodium salt; and compounds substituted with one kind of a substituent group, such as thiophenol sodium salts substituted with a halogen group, such as 4-fluorothiophenol sodium salt, 2,5-difluorothiophenol sodium salt, 2,4,5-trifluorothiophenol sodium salt, 2,4,5,6-tetrafluorothiophenol sodium salt, pentafluorothiophenol sodium salt, 4-chlorothiophenol sodium salt, 2,5-dichlorothiophenol sodium salt, 2,4,5-trichlorothiophenol sodium salt, 2,4,5,6-tetrachlorothiophenol sodium salt, pentachlorothiophenol sodium salt, 4-bromothiophenol sodium salt, 2,5-dibromothiophenol sodium salt, 2,4,5-tribromothiophenol sodium salt, 2,4,5,6-tetrabromothiophenol sodium salt, pentabromothiophenol sodium salt, 4-iodothiophenol sodium salt, 2,5-diiodothiophenol sodium salt, 2,4,5-triiodothiophenol sodium salt, 2,4,5,6-tetraiodothiophenol sodium salt, pentaiodothiophenol sodium salt; thiophenol sodium salts substituted with an alkyl group, such as 4-methylthiophenol sodium salt, 2,4,5-trimethylthiophenol sodium salt, pentamethylthiophenol sodium salt, 4-t-butylthiophenol sodium salt, 2,4,5-tri-t-butylthiophenol sodium salt, penta(t-butyl)thiophenol sodium salt; thiophenol sodium salts substituted with a carboxyl group, such as 4-carboxythiophenol sodium salt, 2,4,6-tricarboxythiophenol sodium salt, pentacarboxythiophenol sodium salt; thiophenol sodium salts substituted with an alkoxycarbonyl group, such as 4-methoxycarbonylthiophenol sodium salt, 2,4,6-trimethoxycarbonylthiophenol sodium salt, pentamethoxycarbonylthiophenol sodium salt; thiophenol sodium salts substituted with a formyl group, such as 4-formylthiophenol sodium salt, 2,4,6-triformylthiophenol sodium salt, pentaformylthiophenol sodium salt; thiophenol sodium salts substituted with an acyl group, such as 4-acetylthiophenol sodium salt, 2,4,6-triacetylthiophenol sodium salt, pentaacetylthiophenol sodium salt; thiophenol sodium salts substituted with a halogenated carbonyl group, such as 4-chlorocarbonylthiophenol sodium salt, 2,4,6-tri(chlorocarbonyl) thiophenol sodium salt, penta(chlorocarbonyl)thiophenol sodium salt; thiophenol sodium salts substituted with a sulfo group, such as 4-sulfothiophenol sodium salt, 2,4,6-trisulfothiophenol sodium salt, pentasulfothiophenol sodium salt; thiophenol sodium salts substituted with an alkoxysulfonyl group, such as 4-methoxysulfonylthiophenol sodium salt, 2,4,6-trimethoxysulfonylthiophenol sodium salt, pentamethoxysulfonylthiophenol sodium salt; thiophenol sodium salts substituted with a halogenated sulfonyl group, such as 4-chlorosulfonylthiophenol sodium salt, 2,4,6-tri(chlorosulfonyl)thiophenol sodium salt, penta(chlorosulfonyl)thiophenol sodium salt; thiophenol sodium salts substituted with a sulfino group, such as 4-sulfinothiophenol sodium salt, 2,4,6-trisulfinothiophenol sodium salt, pentasulfinothiophenol sodium salt; thiophenol sodium salts substituted with an alkylsulfinyl group, such as 4-methylsulfinylthiophenol sodium salt, 2,4,6-tri(methylsulfinyl)thiophenol sodium salt, penta(methylsulfinyl)thiophenol sodium salt; thiophenol sodium salts substituted with a carbamoyl group, such as 4-carbamoylthiophenol sodium salt, 2,4,6-tricarbamoylthiophenol sodium salt, pentacarbamoylthiophenol sodium salt; thiophenol sodium salts substituted with a halogenated alkyl group, such as 4-trichloromethylthiophenol sodium salt, 2,4,6-tri(trichloromethyl)thiophenol sodium salt, penta (trichloromethyl)thiophenol sodium salt; thiophenol sodium salts substituted with a cyano group, such as 4-cyanothiophenol sodium salt, 2,4,6-tricyanothiophenol sodium salt, pentacyanothiophenol sodium salt; thiophenol sodium salts substituted with an alkoxy group, such as 4-methoxythiophenol sodium salt, 2,4,6-trimethoxythiophenol sodium salt, pentamethoxythiophenol sodium salt; and the like.

The organic sulfur compounds represented by the formula (3) include compounds further substituted with another substituent group, such as nitro group (—NO$_2$), amino group (—NH$_2$), hydroxyl group (—OH) and phenylthio group (—SPh) in addition to at least one of one kind of the substituent group described above. Examples thereof include 4-chloro-2-nitrothiophenol sodium salt, 4-chloro-2-aminothiophenol sodium salt, 4-chloro-2-hydroxythiophenol sodium salt, 4-chloro-2-phenylthiothiophenol sodium salt, 4-methyl-2-nitrothiophenol sodium salt, 4-methyl-2-aminothiophenol sodium salt, 4-methyl-2-hydroxythiophenol sodium salt, 4-methyl-2-phenylthiothiophenol sodium salt, 4-carboxy-2-nitrothiophenol sodium salt, 4-carboxy-2-aminothiophenol sodium salt, 4-carboxy-2-hydroxythiophenol sodium salt, 4-carboxy-2-phenylthiothiophenol sodium salt, 4-methoxycarbonyl-2-nitrothiophenol sodium salt, 4-methoxycarbonyl-2-aminothiophenol sodium salt, 4-methoxycarbonyl-2-hydroxythiophenol sodium salt, 4-methoxycarbonyl-2-phenylthiothiophenol sodium salt, 4-formyl-2-nitrothiophenol sodium salt, 4-formyl-2-aminothiophenol sodium salt, 4-formyl-2-hydroxythiophenol sodium salt, 4-formyl-2-phenylthiothiophenol sodium salt, 4-acetyl-2-nitrothiophenol sodium salt, 4-acetyl-2-aminothiophenol sodium salt, 4-acetyl-2-hydroxythiophenol sodium salt, 4-acetyl-2-phenylthiothiophenol sodium salt, 4-chlorocarbonyl-2-nitrothiophenol sodium salt, 4-chlorocarbonyl-2-aminothiophenol sodium salt, 4-chlorocarbonyl-2-hydroxythiophenol sodium salt, 4-chlorocarbonyl-2-phenylthiothiophenol sodium salt, 4-sulfo-2-nitrothiophenol sodium salt, 4-sulfo-2-aminothiophenol sodium salt, 4-sulfo-2-hydroxythiophenol sodium salt, 4-sulfo-2-phenylthiothiophenol sodium salt, 4-methoxysulfonyl-2-nitrothiophenol sodium salt, 4-methoxysulfonyl-2-aminothiophenol sodium salt, 4-methoxysulfonyl-2-hydroxythiophenol sodium salt, 4-methoxysulfonyl-2-phenylthiothiophenol sodium salt, 4-chlorosulfonyl-2-nitrothiophenol sodium salt, 4-chlorosulfonyl-2-aminothiophenol sodium salt, 4-chlorosulfonyl-2-hydroxythiophenol sodium salt, 4-chlorosulfonyl-2-phenylthiothiophenol sodium salt, 4-sulfino-2-nitrothiophenol sodium salt, 4-sulfino-2-aminothiophenol sodium salt, 4-sulfino-2-hydroxythiophenol sodium salt, 4-sulfino-2-phenylthiothiophenol sodium salt, 4-methylsulfinyl-2-nitrothiophenol sodium salt, 4-methylsulfinyl-2-aminothiophenol sodium salt, 4-methylsulfinyl-2-hydroxythiophenol sodium salt, 4-methylsulfinyl-2-phenylthiothiophenol sodium salt, 4-carbamoyl-2-nitrothiophenol sodium salt, 4-carbamoyl-2-aminothiophenol sodium salt, 4-carbamoyl-2-hydroxythiophenol sodium salt, 4-carbamoyl-2-phenylthiothiophenol sodium salt, 4-trichloromethyl-2-nitrothiophenol sodium salt, 4-trichloromethyl-2-aminothiophenol sodium salt, 4-trichloromethyl-2-hydroxythiophenol sodium salt, 4-trichloromethyl-2-phenylthiothiophenol sodium salt, 4-cyano-2-nitrothiophenol sodium salt, 4-cyano-2-aminothiophenol sodium salt, 4-cyano-2-hydroxythiophenol sodium salt, 4-cyano-2-phenylthiothiophenol sodium salt, 4-methoxy-2-nitrothiophenol sodium salt, 4-methoxy-2-aminothiophenol sodium salt, 4-methoxy-2-hydroxythiophenol sodium salt, 4-methoxy-2-phenylthiothiophenol sodium salt and the like.

The organic sulfur compounds represented by the formula (3) include compounds substituted with two or more of the substituent groups described above. Examples thereof include 4-acetyl-2-chlorothiophenol sodium salt, 4-acetyl-2-methylthiophenol sodium salt, 4-acetyl-2-carboxythiophenol sodium salt, 4-acetyl-2-methoxycarbonylthiophenol sodium salt, 4-acetyl-2-formylthiophenol sodium salt, 4-acetyl-2-chlorocarbonylthiophenol sodium salt, 4-acetyl-2-sulfothiophenol sodium salt, 4-acetyl-2-methoxysulfonylthiophenol sodium salt, 4-acetyl-2-chlorosulfonylthiophenol sodium salt, 4-acetyl-2-sulfinothiophenol sodium salt, 4-acetyl-2-methylsulfinylthiophenol sodium salt, 4-acetyl-2-carbamoylthiophenol sodium salt, 4-acetyl-2-trichloromethylthiophenol sodium salt, 4-acetyl-2-cyanothiophenol sodium salt, 4-acetyl-2-methoxythiophenol sodium salt and the like. In the examples of the organic sulfur compounds represented by the formula (3), the monovalent metal atom represented by M other than the sodium includes lithium, potassium, copper (I), silver (I) and the like.

Examples of the organic sulfur compounds represented by the formula (4) include thiophenol zinc salt; and compounds substituted with one kind of a substituent group, such as thiophenol zinc salts substituted with a halogen group, such as 4-fluorothiophenol zinc salt, 2,5-difluorothiophenol zinc salt, 2,4,5-trifluorothiophenol zinc salt, 2,4,5,6-tetrafluorothiophenol zinc salt, pentafluorothiophenol zinc salt, 4-chlorothiophenol zinc salt, 2,5-dichlorothiophenol zinc salt, 2,4,5-trichlorothiophenol zinc salt, 2,4,5,6-tetrachlorothiophenol zinc salt, pentachlorothiophenol zinc salt, 4-bromothiophenol zinc salt, 2,5-dibromothiophenol zinc salt, 2,4,5-tribromothiophenol zinc salt, 2,4,5,6-tetrabromothiophenol zinc salt, pentabromothiophenol zinc salt, 4-iodothiophenol zinc salt, 2,5-diiodothiophenol zinc salt, 2,4,5-triiodothiophenol zinc salt, 2,4,5,6-tetraiodothiophenol zinc salt, pentaiodothiophenol zinc salt; thiophenol zinc salts substituted with an alkyl group, such as 4-methylthiophenol zinc salt, 2,4,5-trimethylthiophenol zinc salt, pentamethylthiophenol zinc salt, 4-t-butylthiophenol zinc salt, 2,4,5-tri-t-butylthiophenol zinc salt, penta(t-butyl)thiophenol zinc salt; thiophenol zinc salts substituted with a carboxyl group, such as 4-carboxythiophenol zinc salt, 2,4,6- tricarboxythiophenol zinc salt, pentacarboxythiophenol zinc salt; thiophenol zinc salts substituted with an alkoxycarbonyl group, such as 4-methoxycarbonylthiophenol zinc salt, 2,4,6-trimethoxycarbonylthiophenol zinc salt, pentamethoxycarbonylthiophenol zinc salt; thiophenol zinc salts substituted with a formyl group, such as 4-formylthiophenol zinc salt, 2,4,6-triformylthiophenol zinc salt, pentaformylthiophenol zinc salt; thiophenol zinc salts substituted with an acyl group, such as 4-acetylthiophenol zinc salt, 2,4,6-triacetylthiophenol zinc salt, pentaacetylthiophenol zinc salt; thiophenol zinc salts substituted with a halogenated carbonyl group, such as 4-chlorocarbonylthiophenol zinc salt, 2,4,6-tri(chlorocarbonyl)thiophenol zinc salt, penta(chlorocarbonyl)thiophenol zinc salt; thiophenol zinc salts substituted with a sulfo group, such as 4-sulfothiophenol zinc salt, 2,4,6-trisulfothiophenol zinc salt, pentasulfothiophenol zinc salt; thiophenol zinc salts substituted with an alkoxysulfonyl group, such as 4-methoxysulfonylthiophenol zinc salt, 2,4,6-trimethoxysulfonylthiophenol zinc salt, pentamethoxysulfonylthiophenol zinc salt; thiophenol zinc salts substituted with a halogenated sulfonyl group, such as 4-chlorosulfonylthiophenol zinc salt, 2,4,6-tri(chlorosulfonyl)thiophenol zinc salt, penta(chlorosulfonyl)thiophenol zinc salt; thiophenol zinc salts substituted with a sulfino group, such as 4-sulfinothiophenol zinc salt, 2,4,6-trisulfinothiophenol zinc salt, pentasulfinothiophenol zinc salt; thiophenol zinc salts substituted with an alkylsulfinyl group, such as 4-methylsulfinylthiophenol zinc salt, 2,4,6-tri(methylsulfinyl)thiophenol zinc salt, penta(methylsulfinyl)thiophenol zinc salt; thiophenol zinc salts substituted with a carbamoyl group, such as 4-carbamoylthiophenol zinc salt, 2,4,6-tricarbamoylthiophenol zinc salt, pentacarbamoylthiophenol zinc salt; thiophenol zinc salts substituted with a halogenated alkyl group, such as 4-trichloromethylthiophenol zinc salt, 2,4,6-tri(trichloromethyl)thiophenol zinc salt, penta(trichloromethyl)thiophenol zinc salt; thiophenol zinc salts substituted with a cyano group, such as 4-cyanothiophenol zinc salt, 2,4,6-tricyanothiophenol zinc salt, pentacyanothiophenol zinc salt; thiophenol zinc salts substituted with an alkoxy group, such as 4-methoxythiophenol zinc salt, 2,4,6-trimethoxythiophenol zinc salt, pentamethoxythiophenol zinc salt; and the like.

The organic sulfur compounds represented by the formula (4) include compounds substituted with another substituent group, such as a nitro group (—NO$_2$), an amino group (—NH$_2$), a hydroxyl group (—OH) and a phenylthio group (—SPh) in addition to at least one of one kind of the substituent group described above. Examples thereof include 4-chloro-2-nitrothiophenol zinc salt, 4-chloro-2-aminothiophenol zinc salt, 4-chloro-2-hydroxythiophenol zinc salt, 4-chloro-2-phenylthiothiophenol zinc salt, 4-methyl-2-nitrothiophenol zinc salt, 4-methyl-2-aminothiophenol zinc salt, 4-methyl-2-hydroxythiophenol zinc salt, 4-methyl-2-phenylthiothiophenol zinc salt, 4-carboxy-2-nitrothiophenol zinc salt, 4-carboxy-2-aminothiophenol zinc salt, 4-carboxy-2-hydroxythiophenol zinc salt, 4-carboxy-2-phenylthiothiophenol zinc salt, 4-methoxycarbonyl-2-nitrothiophenol zinc salt, 4-methoxycarbonyl-2-aminothiophenol zinc salt, 4-methoxycarbonyl-2-hydroxythiophenol zinc salt, 4-methoxycarbonyl-2-phenylthiothiophenol zinc salt, 4-formyl-2-nitrothiophenol zinc salt, 4-formyl-2-aminothiophenol zinc salt, 4-formyl-2-hydroxythiophenol zinc salt, 4-formyl-2-phenylthiothiophenol zinc salt, 4-acetyl-2-nitrothiophenol zinc salt, 4-acetyl-2-aminothiophenol zinc salt, 4-acetyl-2-hydroxythiophenol zinc salt, 4-acetyl-2-phenylthiothiophenol zinc salt, 4-chlorocarbonyl-2-nitrothiophenol zinc salt, 4-chlorocarbonyl-2-aminothiophenol zinc salt, 4-chlorocarbonyl-2-hydroxythiophenol zinc salt, 4-chlorocarbonyl-2-phenylthiothiophenol zinc salt, 4-sulfo-2-nitrothiophenol zinc salt, 4-sulfo-2-aminothiophenol zinc salt, 4-sulfo-2-hydroxythiophenol zinc salt, 4-sulfo-2-phenylthiothiophenol zinc salt, 4-methoxysulfonyl-2-nitrothiophenol zinc salt, 4-methoxysulfonyl-2-aminothiophenol zinc salt, 4-methoxysulfonyl-2-hydroxythiophenol zinc salt, 4-methoxysulfonyl-2-phenylthiothiophenol zinc salt, 4-chlorosulfonyl-2-nitrothiophenol zinc salt, 4-chlorosulfonyl-2-aminothiophenol zinc salt, 4-chlorosulfonyl-2-hydroxythiophenol zinc salt, 4-chlorosulfonyl-2-phenylthiothiophenol zinc salt, 4-sulfino-2-nitrothiophenol zinc salt, 4-sulfino-2-aminothiophenol zinc salt, 4-sulfino-2-hydroxythiophenol zinc salt, 4-sulfino-2-phenylthiothiophenol zinc salt, 4-methylsulfinyl-2-nitrothiophenol zinc salt, 4-methylsulfinyl-2-aminothiophenol zinc salt, 4-methylsulfinyl-2-hydroxythiophenol zinc salt, 4-methylsulfinyl-2-phenylthiothiophenol zinc salt, 4-carbamoyl-2-nitrothiophenol zinc salt, 4-carbamoyl-2-aminothiophenol zinc salt, 4-carbamoyl-2-hydroxythiophenol zinc salt, 4-carbamoyl-2-phenylthiothiophenol zinc salt, 4-trichloromethyl-2-nitrothiophenol zinc salt, 4-trichloromethyl-2-aminothiophenol zinc salt, 4-trichloromethyl-2-hydroxythiophenol zinc salt, 4-trichloromethyl-2-phenylthiothiophenol zinc salt, 4-cyano-2-nitrothiophenol zinc salt, 4-cyano-2-aminothiophenol zinc salt, 4-cyano-2-hydroxythiophenol zinc salt, 4-cyano-2-phenylthiothiophenol zinc salt, 4-methoxy-2-nitrothiophenol zinc salt, 4-methoxy-2-aminothiophenol zinc salt, 4-methoxy-2-hydroxythiophenol zinc salt, 4-methoxy-2-phenylthiothiophenol zinc salt and the like.

The organic sulfur compounds represented by the formula (4) include compounds substituted with two or more of the substituent groups described above. Examples thereof include 4-acetyl-2-chlorothiophenol zinc salt, 4-acetyl-2-methylthiophenol zinc salt, 4-acetyl-2-carboxythiophenol zinc salt, 4-acetyl-2-methoxycarbonylthiophenol zinc salt, 4-acetyl-2-formylthiophenol zinc salt, 4-acetyl-2-chlorocarbonylthiophenol zinc salt, 4-acetyl-2-sulfothiophenol zinc salt, 4-acetyl-2-methoxysulfonylthiophenol zinc salt, 4-acetyl-2-chlorosulfonylthiophenol zinc salt, 4-acetyl-2-sulfinothiophenol zinc salt, 4-acetyl-2-methylsulfinylthiophenol zinc salt, 4-acetyl-2-carbamoylthiophenol zinc salt, 4-acetyl-2-trichloromethylthiophenol zinc salt, 4-acetyl-2-cyanothiophenol zinc salt, 4-acetyl-2-methoxythiophenol zinc salt and the like. In the examples of the organic sulfur compounds represented by the formula (4), the divalent metal atom represented by M' other than the zinc includes magnesium, calcium, strontium, barium, titanium (II), manganese (II), iron (II), cobalt (II), nickel (II), zirconium (II), tin (II) and the like.

Examples of the naphthalenethiols (thionaphthols) are 2-naphthalenethiol, 1-naphthalenethiol, 2-chloro-1-naphthalenethiol, 2-bromo-1-naphthalenethiol, 2-fluoro-1-naphthalenethiol, 2-cyano-1-naphthalenethiol, 2-acetyl-1-naphthalenethiol, 1-chloro-2-naphthalenethiol, 1-bromo-2-naphthalenethiol, 1-fluoro-2-naphthalenethiol, 1-cyano-2-naphthalenethiol, and 1-acetyl-2-naphthalenethiol and metal salts thereof. Preferable examples include 1-naphthalenethiol, 2-naphthalenethiol and zinc salt thereof.

The sulfenamide based organic sulfur compound includes, for example, N-cyclohexyl-2-benzothiazole sulfenamide, N-oxydiethylene-2-benzothiazole sulfenamide, and N-t-butyl-2-benzothiazole sulfenamide. The thiuram based organic sulfur compound includes, for example, tetramethylthiuram monosulfide, tetramethylthiuram disulfide, tetraethylthiuram disulfide, tetrabutylthiuram disulfide, and dipentamethylenethiuram tetrasulfide. The dithiocarbamates include, for example, zinc dimethyldithiocarbamate, zinc diethyldithiocarbamate, zinc dibutyldithiocarbamate, zinc ethylphenyl dithiocarbamate, sodium dimethyldithiocarbamate, sodium diethyldithiocarbamate, copper (II) dimethyldithiocarbate, iron (III) dimethyldithiocarbamate, selenium diethyldithiocarbamate, and tellurium diethyldithiocarbamate. The thiazole based organic sulfur compound includes, for example, 2-mercaptobenzothiazole (MBT), dibenzothiazyl disulfide (MBTS), sodium salt, zinc salt, copper salt, or cyclohexylamine salt of 2-mercaptobenzothiazole, 2-(2,4-dinitrophenyl) mercaptobenzothiazole, and 2-(2,6-diethyl-4-morpholinothio) benzothiazole.

(f) The organic sulfur compound can be used solely or as a mixture of at least two of them.

The content of (f) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the content of (f) the organic sulfur compound is less than 0.05 part by mass, the effect of adding (f) the organic sulfur compound cannot be obtained and thus the resilience may not improve. If the content of (f) the organic sulfur compound exceeds 5.0 parts by mass, the compression deformation amount of the obtained golf ball becomes large and thus the resilience may be lowered.

The rubber composition used in the present invention can include additives such as a pigment, a filler for adjusting weight or the like, an antioxidant, a peptizing agent, and a softener where necessary in addition to (a) the base rubber, (b) the α,β-unsaturated carboxylic acid having 3 to 8 carbon atoms and/or the metal salt thereof, (c) the crosslinking initiator and (d) the carboxylic acid or the salt thereof. Further, as described above, if the rubber composition used in the present invention contains only the α,β-unsaturated carboxylic acid having 3 to 8 carbon atoms as a crosslinking agent, the rubber composition preferably contains (e) the metal compound.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. The blending amount of titanium oxide is preferably 0.5 part by mass or more, and more preferably 2 parts by mass or more, and is preferably 8 parts by mass or less, and more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The blending amount of the blue pigment is preferably 0.001 part by mass or more, and more preferably 0.05 part by mass or more, and is preferably 0.2 part by mass or less, and more preferably 0.1 part by mass or less, with respect to 100 parts by mass of (a) the base rubber. If the blending amount of the blue pigment is less than 0.001 part by mass, blueness is insufficient, and the color looks yellowish. If the blending amount of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as an final product. The filler may be blended where necessary. The filler includes, for example, inorganic fillers such as zinc oxide, barium sulfate, calcium carbonate, magnesium oxide, tungsten powder, molybdenum powder, or the like. The filler more preferably includes zinc oxide. It is considered that zinc oxide functions as a vulcanization aid to enhance the hardness of the whole core. The content of the filler is preferably 0.5 part by mass or more, more preferably 1 part by mass or more, and is preferably 30 parts by mass or less, more preferably 25 parts by mass or less, even more preferably 20 parts by mass or less. If the content of the filler is less than 0.5 part by mass, it is difficult to adjust the weight, while if the content of the filler exceeds 30 parts by mass, the weight ratio of the rubber component becomes small and thus the resilience tends to be lowered.

The blending amount of the antioxidant is preferably 0.1 part by mass or more and 1 part by mass or less, with respect to 100 parts by mass of (a) the base rubber. In addition, the blending amount of the peptizing agent is preferably 0.1 part by mass or more and 5 parts by mass or less, with respect to 100 parts by mass of (a) the base rubber.

The rubber composition used in the present invention is obtained by mixing and kneading (a) the base rubber, (b) the α,β-unsaturated carboxylic acid having 3 to 8 carbon atoms and/or the metal salt thereof, (c) the crosslinking initiator, and (d) the carboxylic acid or the salt thereof, if necessary (e) the metal compound and/or (f) the organic sulfur compound. The kneading can be conducted, without any limitation, with a well-known kneading machine such as a kneading roll, a banbury mixer, a kneader, or the like.

The spherical core of the golf ball of the present invention can be obtained by molding the rubber composition after kneaded. The temperature for molding the spherical core is preferably 120° C. or more, more preferably 150° C. or more, even more preferably 160° C. or more, and is preferably 170° C. or less. If the molding temperature exceeds 170° C., the surface hardness of the core tends to decrease. The molding pressure preferably ranges from 2.9 MPa to 11.8 MPa. The molding time preferably ranges from 10 minutes to 60 minutes. In the present invention, it is preferable to select the molding condition in order to make the spherical core have a desired hardness distribution.

In a preferable embodiment, when the hardness is measured at nine points obtained by dividing a radius of the spherical core into equal parts having 12.5% interval and the hardness is plotted against distance (%) from the center of the spherical core, the spherical core is such that $R^2$ of a linear approximation curve obtained by the least square method is 0.95 or higher. If $R^2$ is 0.95 or more, the linearity of the core hardness distribution is enhanced, thus the spin rate on driver shots decreases, resulting in the greater flight distance.

The hardness of the spherical core is JIS-C hardness measured at nine points obtained by dividing a radius of the spherical core into equal parts having 12.5% interval. That is, JIS-C hardness is measured at nine points, namely at distances of 0% (core center), 12.5%, 25%, 37.5%, 50%, 62.5%, 75%, 87.5%, 100% (core surface) from the core center. Next, the measurement results are plotted to make a graph having JIS-C hardness as a vertical axis and distances (%) from the core center as a horizontal axis. In the present invention, $R^2$ of a linear approximation curve obtained from this graph by the least square method is preferably 0.95 or higher. $R^2$ of the linear approximation curve obtained by the least square method indicates the linearity of the obtained plot. In the present invention, $R^2$ of 0.95 or more means that the core has the hardness distribution where the hardness increases linearly or almost linearly. If the core having the hardness distribution where the hardness increases linearly or almost linearly is used for the golf ball, the spin rate on driver shots decrease. As a result, the flight distance on driver shots increases. $R^2$ of the linear approximation curve is preferably 0.96 or more. The higher linearity provides a greater flight distance on driver shots.

The spherical core preferably has a hardness difference (Hs−H0) between a surface hardness Hs and a center hardness H0 of 15 or more, more preferably 18 or more, even more preferably 20 or more, most preferably 22 or more, and preferably has a hardness difference of 80 or less, more preferably 70 or less, even more preferably 60 or less in JIS-C hardness. If the hardness difference between the center hardness and the surface hardness is large, the golf ball having a great flight distance due to the high launch angle and low spin rate is obtained.

The spherical core preferably has the center hardness H0 of 30 or more, more preferably 40 or more, even more preferably 45 or more, most preferably 50 or more in JIS-C hardness. If the center hardness H0 is less than 30 in JIS-C hardness, the core becomes too soft and thus the resilience may be lowered. Further, the spherical core has the center hardness H0 of 70 or less, more preferably 65 or less, even more preferably 60 or less in JIS-C hardness. If the center hardness H0 exceeds 70 in JIS-C hardness, the core becomes too hard and thus the shot feeling tends to be lowered.

The spherical core preferably has the surface hardness Hs of 72 or more, more preferably 74 or more, even more preferably 76 or more, even more preferably 78 or more, most preferably 80 or more, and has preferably has the surface hardness Hs of 100 or less, more preferably 95 or less, even more preferably 90 or less in JIS-C hardness. If the surface hardness is 72 or more in JIS-C hardness, the spherical core does not become excessively soft, and thus the better resilience is obtained. Further, if the surface hardness of the spherical core is 100 or less in JIS-C hardness, the spherical core does not become excessively hard, and thus the better shot feeling is obtained.

The spherical core preferably has the diameter of 34.8 mm or more, more preferably 36.8 mm or more, and even more preferably 38.8 mm or more, and preferably has the diameter of 42.2 mm or less, more preferably 41.8 mm or less, and even more preferably 41.2 mm or less, and most preferably 40.8 mm or less. If the spherical core has the diameter of 34.8 mm or more, the thickness of the cover does not become too thick and thus the resilience becomes better. On the other hand, if the spherical core has the diameter of 42.2 mm or less, the thickness of the cover does not become too thin, and hence a protection ability of the cover is sufficiently provided.

When the spherical core has a diameter from 34.8 mm to 42.2 mm, a compression deformation amount (shrinking deformation amount of the spherical core along the compression direction) of the spherical core when applying a load from 98 N as an initial load to 1275 N as a final load is preferably 2.0 mm or more, more preferably 2.8 mm or more, and is preferably 6.0 mm or less, more preferably 5.0 mm or less, even more preferably 4.5 mm or less. If the compression deformation amount is 2.0 mm or more, the shot feeling of the golf ball becomes better. If the compression deformation amount is 6.0 mm or less, the resilience of the golf ball becomes better.

The golf ball cover of the present invention is formed from a cover composition comprising a resin component. Examples of the resin component include, for example, an ionomer rein; a thermoplastic polyurethane elastomer having a commercial name of "Elastollan (e.g. "Elastollan XNY85A")" commercially available from BASF Japan Ltd; a thermoplastic polyamide elastomer having a commercial name of "Pebax (e.g. "Pebax 2533")" commercially available from Arkema K. K.; a thermoplastic polyester elastomer having a commercial name of "Hytrel (e.g. "Hytrel 3548", "Hytrel 4047")" commercially available from Du Pont-Toray Co., Ltd.; and a thermoplastic styrene elastomer having a commercial name of "Rabalon (e.g. "Rabalon T3221C")" commercially available from Mitsubishi Chemical Corporation; and the like.

The ionomer resin includes a product prepared by neutralizing at least a part of carboxyl groups in the binary copolymer composed of an olefin and an α,β-unsaturated carboxylic acid having 3 to 8 carbon atoms with a metal ion, a product prepared by neutralizing at least a part of carboxyl groups in the ternary copolymer composed of an olefin, an α,β-unsaturated carboxylic acid having 3 to 8 carbon atoms, and an α,β-unsaturated carboxylic acid ester with a metal ion, or a mixture of those. The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among these, the ionomer resin preferably includes the metal ion-neutralized product of the binary copolymer composed of ethylene-(meth)acrylic acid and the metal ion-neutralized product of the ternary copolymer composed of ethylene, (meth)acrylic acid, and (meth)acrylic acid ester.

Specific examples of the ionomer resins include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM7311 (Mg), Himilan AM7329(Zn); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 6320 (Mg), Surlyn 8120 (Na), Surlyn 8320 (Na), Surlyn 9320 (Zn), HPF 1000 (Mg), HPF 2000 (Mg))" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation.

It is noted that Na, Zn, Li, and Mg described in the parentheses after the trade names indicate metal types of neutralizing metal ions for the ionomer resins.

The cover composition constituting the cover of the golf ball of the present invention preferably includes, as a resin component, a thermoplastic polyurethane elastomer or an ionomer rein. In case of using the ionomer rein, it is preferred to use a thermoplastic styrene elastomer together. The content of the polyurethane or ionomer resin in resin component of the cover composition is preferably 50 mass % or more, more preferably 60 mass % or more, even more preferably 70 mass % or more.

In the present invention, the cover composition may further contain a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair the effect of the present invention.

The amount of the white pigment (for example, titanium oxide) is preferably 0.5 part or more, more preferably 1 part or more, and the content of the white pigment is preferably 10 parts or less, more preferably 8 parts or less, with respect to 100 parts of the resin component constituting the cover by mass. If the amount of the white pigment is 0.5 part by mass or more, it is possible to impart the opacity to the resultant cover. Further, if the amount of the white pigment is more than 10 parts by mass, the durability of the resultant cover may deteriorate.

The slab hardness of the cover composition is preferably set in accordance with the desired performance of the golf balls. For example, in case of a so-called distance golf ball which focuses on a flight distance, the cover composition preferably has a slab hardness of 50 or more, more preferably 55 or more, and preferably has a slab hardness of 80 or less, more preferably 70 or less in shore D hardness. If the cover composition has a slab hardness of 50 or more, the obtained golf ball has a high launch angle and low spin rate on driver shots and iron shots, and thus the flight distance becomes large. If the cover composition has a slab hardness of 80 or less, the golf ball excellent in durability is obtained. Further, in case of a so-called spin golf ball which focuses on controllability, the cover composition preferably has a slab hardness of less than 50, and preferably has a slab hardness of 20 or more, more preferably 25 or more in shore D hardness. If the cover composition has a slab hardness of less than 50, the flight distance on driver shots can be improved by the core of the present invention, as well as the obtained golf ball readily stops on the green due to the high spin rate on approach shots. If the cover composition has a slab hardness of 20 or more, the abrasion resistance improves. In case of a plurality of cover layers, the slab hardness of the cover composition constituting each layer can be identical or different, as long as the slab hardness of each layer is within the above range.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of directly injection molding the cover composition, the cover composition extruded in the pellet form beforehand may be used for injection molding or the materials such as the base resin components and the pigment may be dry blended, followed by directly injection molding the blended material. It is preferred to use upper and lower molds having a spherical cavity and pimples for forming a cover, wherein a part of the pimples also serves as a retractable hold pin. When molding the cover by injection molding, the hold pin is protruded to hold the core, and the cover composition which has been heated and melted is charged and then cooled to obtain a cover. For example, it is preferred that the cover composition heated and melted at the temperature ranging from 200° C. to 250° C. is charged into a mold held under the pressure of 9 MPa to 15 MPa for 0.5 to 5 seconds, and after cooling for 10 to 60 seconds, the mold is opened and the golf ball with the cover molded is taken out from the mold.

The concave portions called "dimple" are usually formed on the surface of the cover. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, roughly hexagonal shape, and another irregular shape. The shape of the dimples is employed solely or at least two of them may be used in combination.

In the present invention, the thickness of the cover of the golf ball is preferably 4.0 mm or less, more preferably 3.0 mm or less, even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, and even more preferably 0.8 mm or more, and most preferably 1.0 mm or more. If the thickness of the cover is less than 0.3 mm, the durability and the wear resistance of the cover may deteriorate. If the cover has a plurality of layers, it is preferred that the total thickness of the cover layers falls within the above range.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 50 µm or smaller, and more preferably 40 µm or smaller, even more preferably 30 µm or smaller. If the thickness is smaller than 5 µm, the paint film is easy to wear off due to continued use of the golf ball, and if the thickness is larger than 50 µm, the effect of the dimples is reduced, resulting in lowering flying performance of the golf ball.

When the golf ball of the present invention has a diameter in a range from 40 mm to 45 mm, a compression deformation amount of the golf ball (shrinking amount of the golf ball in the compression direction thereof) when applying a load from an initial load of 98 N to a final load of 1275 N to the golf ball is preferably 2.0 mm or more, more preferably 2.4 mm or more, even more preferably 2.5 mm or more, most preferably 2.8 mm or more, and is preferably 5.0 mm or less, more preferably 4.5 mm or less, even more preferably 4.2 mm or less, even more preferably 4.0 mm or less, even more preferably 3.8 mm or less, most preferably 3.6 mm or less. If the compression deformation amount is 2.0 mm or more, the golf ball does not become excessively hard, and thus exhibits the good shot feeling. On the other hand, if the compression deformation amount is 5.0 mm or less, the resilience is enhanced.

The golf ball construction is not limited, as long as the golf ball of the present invention comprises a spherical core and at least one cover layer covering the spherical core. FIG. 1 is a partially cutaway sectional view showing the golf ball 2 according to the preferable embodiment of the present invention. The golf ball 2 comprises a spherical core 4, and a cover 12 covering the spherical core 4. Plurality of dimples 14 are formed on a surface of the cover. Other portions than dimples 14 on the surface of the golf ball 2 are land 16. The golf ball 2 is provided with a paint layer and a mark layer outside the cover 12, but these layers are not depicted.

The spherical core preferably has a single layered structure. Unlike the multi-layered structure, the spherical core of the single layered structure does not have an energy loss at the interface of the multi-layered structure when hitting, and thus has an improved resilience. The cover has a structure of at least one layer, for example a single layered structure, or a multi-layered structure of at least two layers. The golf ball of the present invention includes, for example, a two-piece golf ball comprising a spherical core and a single layered cover disposed around the spherical core, a multi-piece golf ball comprising a spherical core, and at least two cover layers disposed around the spherical core (including the three-piece golf ball), and a wound golf ball comprising a spherical core, a rubber thread layer which is formed around the spherical core, and a cover disposed over the rubber thread layer. The present invention can be suitably applied any one of the above golf balls.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Compression Deformation Amount (mm)
A compression deformation amount of the core or golf ball (a shrinking amount of the core or golf ball in the compression direction thereof), when applying a load from 98 N as an initial load to 1275 N as a final load to the core or golf ball, was measured.

(2) Coefficient of Restitution
A 198.4 g of metal cylindrical object was allowed to collide with each core or golf ball at a speed of 40 m/sec, and the speeds of the cylindrical object and the core or golf ball before and after the collision were measured. Based on these speeds and the mass of each object, coefficient of restitution for each core or golf ball was calculated. The measurement was conducted by using twelve samples for each core or golf ball, and the average value was regarded as the coefficient of restitution for the core or golf ball. In Tables 3 to 6, the coefficient of restitution is shown as the difference from that of core No. 6-2. In Tables 8 to 13, the coefficient of restitution of golf balls No. 1 to No. 12, No. 24, 25, 28, 29 are shown as the difference from that of the golf ball No. 7. The coefficient of restitution of golf balls No. 13 to 23, 26, 27, 30, 31 are shown as the difference from that of the golf ball No. 19.

(3) Slab Hardness (Shore D Hardness)
Sheets with a thickness of about 2 mm were produced by injection molding the cover composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(4) Hardness Distribution of Spherical Core (JIS-C Hardness)
A type P1 auto loading durometer manufactured by Kobunshi Keiki Co., Ltd., provided with a JIS-C type spring hardness tester was used to measure the hardness of the spherical core. The hardness measured at the surface of the spherical core was adopted as the surface hardness of the spherical core. The spherical core was cut into two hemispheres to obtain a cut plane, and the hardness were measured at the central point and at predetermined distances from the central point. The core hardness were measured at 4 points at predetermined distances from the central point of the cut plane of the core. The core hardness was calculated by averaging the hardness measured at 4 points.

(5) Flight Distance (m) and Spin Rate (Rpm) on a Driver Shot
A metal-headed W#1 driver (XXIO S, loft: 11°, manufactured by SRI Sports Limited) was installed on a swing robot M/C manufactured by Golf Laboratories, Inc. A golf ball was hit at a head speed of 40 m/sec, and the flight distance (the distance from the launch point to the stop point) and the spin rate right after hitting the golf ball were measured. This measurement was conducted twelve times for each golf ball, and the average value was adopted as the measurement value for the golf ball. A sequence of photographs of the hit golf ball were taken for measuring the spin rate (rpm) right after hitting the golf ball.

[Production of Golf Balls Using the Carboxylic Acid]
(1) Production of Cores
The rubber compositions having formulations shown in Tables 3 to 6, 12, and 13 were kneaded and heat-pressed in upper and lower molds, each having a hemispherical cavity, at 170° C. for 20 minutes to prepare spherical cores having a diameter of 39.8 mm. The amount of Sanceler SR was changed for each core No. 1 to 10, 12, and 13 to produce two to three kinds of cores (Nos. X-1 to X-3, X=1 to 13) having different compression deformation amounts. The amount of stearic acid of core No. 5 was changed to produce core No. 11.

TABLE 3

| Core No. | | 1-1 | 1-2 | 1-3 | 2-1 | 2-2 | 2-3 | 3-1 | 3-2 | 3-3 | 4-1 | 4-2 | 4-3 |
|---|---|---|---|---|---|---|---|---|---|---|---|---|---|
| Rubber composition (parts by mass) | BR730 | 100 | 100 | 100 | 100 | 100 | 100 | 100 | 100 | 100 | 100 | 100 | 100 |
| | Sanceler SR | 26 | 28 | 30 | 26 | 28 | 30 | 25 | 27 | 29 | 24 | 26 | 28 |
| | Zinc oxide | 5 | 5 | 5 | 5 | 5 | 5 | 5 | 5 | 5 | 5 | 5 | 5 |
| | Barium sulfate | *1) | *1) | *1) | *1) | *1) | *1) | *1) | *1) | *1) | *1) | *1) | *1) |
| | 2-Thionaphthol | 0.32 | 0.32 | 0.32 | — | — | — | — | — | — | — | — | — |
| | PCTP | — | — | — | 0.56 | 0.56 | 0.56 | — | — | — | — | — | — |
| | PBDS | — | — | — | — | — | — | 1.0 | 1.0 | 1.0 | — | — | — |
| | DPDS | — | — | — | — | — | — | — | — | — | 0.22 | 0.22 | 0.22 |
| | Stearic acid | 10 | 10 | 10 | 10 | 10 | 10 | 10 | 10 | 10 | 10 | 10 | 10 |
| | Dicumyl peroxide | 0.8 | 0.8 | 0.8 | 0.8 | 0.8 | 0.8 | 0.8 | 0.8 | 0.8 | 0.8 | 0.8 | 0.8 |
| | Total amount of fatty acid | 12.6 | 12.8 | 13 | 12.6 | 12.8 | 13 | 12.5 | 12.7 | 12.9 | 12.4 | 12.6 | 12.8 |
| Core properties | Coefficient of Restitution | 0.012 | 0.016 | 0.023 | 0.014 | 0.02 | 0.026 | 0.012 | 0.017 | 0.022 | 0.013 | 0.019 | 0.025 |
| | Compression deformation amount (mm) | 4.29 | 3.94 | 3.64 | 4.38 | 4.06 | 3.74 | 4.40 | 4.09 | 3.80 | 3.95 | 3.62 | 3.40 |

*1) As to an amount of barium sulfate, adjustment was made such that the golf ball had a mass of 45.4 g.

TABLE 4

| Core No. | | 5-1 | 5-2 | 5-3 | 6-1 | 6-2 | 6-3 | 7-1 | 7-2 | 7-3 | 8-1 | 8-2 | 8-3 |
|---|---|---|---|---|---|---|---|---|---|---|---|---|---|
| Rubber composition (parts by mass) | BR730 | 100 | 100 | 100 | 100 | 100 | 100 | 100 | 100 | 100 | 100 | 100 | 100 |
| | Sanceler SR | 21 | 23 | 25 | 21 | 23 | 25 | 26 | 28 | 30 | 26 | 28 | 30 |
| | Zinc oxide | 5 | 5 | 5 | 5 | 5 | 5 | 5 | 5 | 5 | 5 | 5 | 5 |
| | Barium sulfate | *1) | *1) | *1) | *1) | *1) | *1) | *1) | *1) | *1) | *1) | *1) | *1) |
| | 2-Thionaphthol | — | — | — | — | — | — | 0.32 | 0.32 | 0.32 | — | — | — |
| | PCTP | — | — | — | — | — | — | — | — | — | 0.56 | 0.56 | 0.56 |
| | PBDS | — | — | — | — | — | — | — | — | — | — | — | — |
| | DPDS | — | — | — | — | — | — | — | — | — | — | — | — |
| | Stearic acid | 10 | 10 | 10 | — | — | — | — | — | — | — | — | — |
| | Dicumyl peroxide | 0.8 | 0.8 | 0.8 | 0.8 | 0.8 | 0.8 | 0.8 | 0.8 | 0.8 | 0.8 | 0.8 | 0.8 |
| | Total amount of fatty acid | 12.1 | 12.3 | 12.5 | 2.1 | 2.3 | 2.5 | 2.6 | 2.8 | 3.0 | 2.6 | 2.8 | 3.0 |
| Core properties | Coefficient of Restitution | −0.009 | 0.002 | 0.005 | −0.012 | 0 | 0.009 | 0.001 | 0.007 | 0.012 | 0.012 | 0.018 | 0.024 |
| | Compression deformation amount (mm) | 4.57 | 4.14 | 3.85 | 4.80 | 4.29 | 3.94 | 4.73 | 4.38 | 4.06 | 4.43 | 4.11 | 3.78 |

*1) As to an amount of barium sulfate, adjustment was made such that the golf ball had a mass of 45.4 g.

TABLE 5

| Core No. | | 9-1 | 9-2 | 9-3 | 10-1 | 10-2 | 10-3 | 11 |
|---|---|---|---|---|---|---|---|---|
| Rubber composition (parts by mass) | BR730 | 100 | 100 | 100 | 100 | 100 | 100 | 100 |
| | Sanceler SR | 25 | 27 | 29 | 24 | 26 | 28 | 23 |
| | Zinc oxide | 5 | 5 | 5 | 5 | 5 | 5 | 5 |
| | Barium sulfate | *1) | *1) | *1) | *1) | *1) | *1) | *1) |
| | 2-Thionaphthol | — | — | — | — | — | — | — |
| | PCTP | — | — | — | — | — | — | — |
| | PBDS | 1.0 | 1.0 | 1.0 | — | — | — | — |
| | DPDS | — | — | — | 0.22 | 0.22 | 0.22 | — |
| | Stearic acid | — | — | — | — | — | — | 3 |
| | Dicumyl peroxide | 0.8 | 0.8 | 0.8 | 0.8 | 0.8 | 0.8 | 0.8 |
| | Total amount of fatty acid | 2.5 | 2.7 | 2.9 | 2.4 | 2.6 | 2.8 | 5.3 |
| Core properties | Coefficient of Restitution | 0.009 | 0.014 | 0.019 | 0.004 | 0.01 | 0.016 | 0.009 |
| | Compression deformation amount (mm) | 4.50 | 4.19 | 3.90 | 4.35 | 4.07 | 3.80 | 3.95 |

*1) As to an amount of barium sulfate, adjustment was made such that the golf ball had a mass of 45.4 g.

TABLE 6

| Core No. | | 12-1 | 12-2 | 12-3 | 13-1 | 13-2 |
|---|---|---|---|---|---|---|
| Rubber composition (parts by mass) | BR730 | 100 | 100 | 100 | 100 | 100 |
| | Sanceler SR | 27 | 29 | 30 | 29 | 31 |
| | Zinc oxide | 5 | 5 | 5 | 5 | 5 |
| | Barium sulfate | *1) | *1) | *1) | *1) | *1) |
| | 2-Thionaphthol | 0.32 | 0.32 | 0.32 | 0.32 | 0.32 |
| | PCTP | — | — | — | — | — |
| | PBDS | — | — | — | — | — |
| | DPDS | — | — | — | — | — |
| | Myristic acid | 10 | 10 | 10 | — | — |
| | Decanoic acid | — | — | — | 5 | 5 |
| | Dicumyl peroxide | 0.8 | 0.8 | 0.8 | 0.8 | 0.8 |
| | Total amount of fatty acid | 12.7 | 12.9 | 13.0 | 7.9 | 8.1 |
| Core properties | Coefficient of Restitution | 0.007 | 0.012 | 0.016 | 0.010 | 0.016 |
| | Compression deformation amount (mm) | 4.55 | 4.29 | 4.00 | 4.39 | 4.00 |

*1) As to an amount of barium sulfate, adjustment was made such that the golf ball had a mass of 45.4 g.

BR730: a high-cis polybutadiene (cis-1,4 bond content=96 mass %, 1,2-vinyl bond content=1.3 mass %, Moony viscosity ($ML_{1+4}$ (100° C.)=55, molecular weight distribution (Mw/Mn)=3) available from JSR Corporation
Sanceler SR: zinc acrylate (product of 10 mass % stearic acid coating) available from Sanshin Chemical Industry Co., Ltd.
Zinc oxide: "Ginrei R" manufactured by Toho Zinc Co., Ltd.
Barium sulfate: "Barium sulfate BD" manufactured by Sakai Chemical Industry Co., Ltd., adjustment was made such that the finally obtained golf ball had a mass of 45.4 g.
2-thionaphthol: manufactured by Tokyo Chemical Industry Co., Ltd.
PCTP: Pentachlorothiophenol manufactured by Tokyo Chemical Industry Co., Ltd.
PBDS: bis(pentabromophenyl)disulfide
DPDS: Diphenyl disulfide available manufactured by Sumitomo Seika Chemicals Co., Ltd.
DCP: Dicumyl peroxide: "Percumyl (registered trademark) D" manufactured by NOF Corporation.
Stearic acid: manufactured by NOF Corporation
Myristic acid: manufactured by Tokyo Chemical Industry Co., Ltd.
Decanoic acid: manufactured by Tokyo Chemical Industry Co., Ltd.
Cyclohexanecarboxylic acid: manufactured by Tokyo Chemical Industry Co., Ltd The obtained cores (No. 1 to No. 4) were cut into two halves and the cross sectional surfaces of the cores were analyzed with Fourier transform infrared spectrophotometer (Spectrum One) available from PerkinElmer, Inc. In the core central part within 1 mm from the center of the core, a peak of 1543 $cm^{-1}$, which is attributed to the metal salt of (d) stearic acid, was observed, but in the core surface part, the peak of 1543 $cm^{-1}$, which is attributed to the metal salt of (d) stearic acid, was not observed.

(2) Production of Cover

Cover materials shown in Table 7 were mixed with a twin-screw kneading extruder to prepare the cover compositions in the pellet form. The extruding conditions of the cover composition were a screw diameter of 45 mm, a screw rotational speed of 200 rpm, and screw L/D=35, and the mixtures were heated to 150 to 230° C. at the die position of the extruder. The cover compositions obtained above were injection-molded onto the spherical cores to produce the golf balls having the spherical core and the cover covering the spherical core. The cover compositions having Shore D hardness of 50 or more were used for preparing distance-type golf balls No. 1 to No. 12, 24, 25, 28, and 29 and the cover compositions having Shore D hardness of less than 50 were used to produce the control-type golf balls No. 13 to No. 23, 26, 27, 30 and 31.

TABLE 7

| Cover composition No. | A | B | C | D |
|---|---|---|---|---|
| Himilan 1605 | 50 | — | — | — |
| Himilan 1706 | 50 | — | — | — |
| Himilan 1855 | — | 50 | — | — |
| Himilan 1856 | — | 50 | — | — |
| Elastollan XNY97A | — | — | 100 | — |
| Elastollan XNY85A | — | — | — | 100 |
| Titanium oxide | 4 | 4 | 4 | 4 |
| Slab hardness (shore D) | 65 | 55 | 47 | 32 |

Formulation: parts by mass

Himilan 1605: Sodium ion neutralized ethylene-methacrylic acid copolymer ionomer resin available from Du Pont-Mitsui Polychemicals Co., Ltd Himilan 1706: Zinc ion neutralized ethylene-methacrylic acid copolymer ionomer resin available from Du Pont-Mitsui Polychemicals Co., Ltd Himilan 1855: Zinc ion neutralized ethylene-methacrylic acid-isobutylacrylate copolymer ionomer resin available from Du Pont-Mitsui Polychemicals Co., Ltd Himilan 1856: Sodium ion neutralized ethylene-methacrylic acid-isobutylacrylate copolymer ionomer resin available from Du Pont-Mitsui Polychemicals Co., Ltd Elastollan XNY85A: Thermoplastic polyurethane elastomer available from BASF Japan Co.

Elastollan XNY97A: Thermoplastic polyurethane elastomer available from BASF Japan Co.

The results of the golf ball were shown in Table 8 to 13.

TABLE 8

| | | Golf ball No. | | | | | |
|---|---|---|---|---|---|---|---|
| | | 1 | 2 | 3 | 4 | 5 | 6 |
| | Core No. | 1-2 | 1-2 | 2-2 | 3-2 | 4-1 | 5-2 |
| Rubber composition (parts by mass) | BR730 | 100 | 100 | 100 | 100 | 100 | 100 |
| | Sanceler SR | 28 | 28 | 28 | 27 | 24 | 23 |
| | Zinc Oxide | 5 | 5 | 5 | 5 | 5 | 5 |
| | Barium sulfate | *1) | *1) | *1) | *1) | *1) | *1) |
| | 2-Thionaphthol | 0.32 | 0.32 | — | — | — | — |
| | PCTP | — | — | 0.56 | — | — | — |
| | PBDS | — | — | — | 1.0 | — | — |
| | DPDS | — | — | — | — | 0.22 | — |
| | Stearic acid | 10 | 10 | 10 | 10 | 10 | 10 |
| | Myristic acid | — | — | — | — | — | — |
| | Dicumyl peroxide | 0.8 | 0.8 | 0.8 | 0.8 | 0.8 | 0.8 |
| | Total amount of carboxylic acid | 12.8 | 12.8 | 12.8 | 12.7 | 12.4 | 12.3 |
| Core hardness distribution (JIS-C) | Center hardness | 54.2 | 54.2 | 57.0 | 59.0 | 62.3 | 56.9 |
| | 12.5% point hardness | 58.2 | 58.2 | 62.8 | 62.6 | 66.0 | 61.7 |
| | 25% point hardness | 62.5 | 62.5 | 65.6 | 65.7 | 68.4 | 65.7 |
| | 37.5% point hardness | 65.1 | 65.1 | 68.5 | 67.3 | 69.4 | 67.2 |
| | 50% point hardness | 65.9 | 65.9 | 68.8 | 67.9 | 70.0 | 67.8 |
| | 62.5% point hardness | 70.0 | 70.0 | 69.5 | 69.0 | 72.3 | 70.4 |
| | 75% point hardness | 77.7 | 77.7 | 75.2 | 73.0 | 75.7 | 74.6 |
| | 87.5% point hardness | 80.7 | 80.7 | 78.4 | 76.8 | 76.4 | 76.2 |
| | Surface hardness | 83.6 | 83.6 | 82.2 | 81.2 | 80.4 | 80.7 |
| | Surface hardness − center hardness | 29.4 | 29.4 | 25.2 | 22.2 | 18.1 | 23.8 |
| | $R^2$ of approximated curve | 0.98 | 0.98 | 0.96 | 0.95 | 0.97 | 0.97 |
| | Slope of approximated curve | 0.29 | 0.29 | 0.22 | 0.20 | 0.16 | 0.21 |
| | Core coefficient of restitution | 0.016 | 0.016 | 0.020 | 0.017 | 0.013 | 0.002 |
| | Core compression deformation amount (mm) | 3.94 | 3.94 | 4.06 | 4.09 | 3.95 | 4.14 |
| | Cover composition | A | B | A | A | A | A |
| | Cover hardness (Shore D) | 65 | 55 | 65 | 65 | 65 | 65 |
| | Cover thickness (mm) | 1.5 | 1.5 | 1.5 | 1.5 | 1.5 | 1.5 |
| Ball | Driver spin rate (rpm) | −90 | −20 | −70 | −20 | −20 | −70 |
| | Driver flying distance (m) | 3.8 | 2.6 | 4.1 | 2.3 | 2.1 | 1.4 |
| | Coefficient of restitution | 0.016 | 0.011 | 0.020 | 0.017 | 0.013 | 0.002 |
| | Compression deformation amount (mm) | 3.24 | 3.34 | 3.36 | 3.39 | 3.25 | 3.44 |

TABLE 9

| | | Golf ball No. | | | | | |
|---|---|---|---|---|---|---|---|
| | | 7 | 8 | 9 | 10 | 11 | 12 |
| | Core No. | 6-2 | 7-3 | 8-2 | 9-2 | 10-2 | 11 |
| Rubber composition (parts by mass) | BR730 | 100 | 100 | 100 | 100 | 100 | 100 |
| | Sanceler SR | 23 | 30 | 28 | 27 | 26 | 23 |
| | Zinc Oxide | 5 | 5 | 5 | 5 | 5 | 5 |
| | Barium sulfate | *1) | *1) | *1) | *1) | *1) | *1) |
| | 2-Thionaphthol | — | 0.32 | — | — | — | — |
| | PCTP | — | — | 0.56 | — | — | — |
| | PBDS | — | — | — | 1.0 | — | — |
| | DPDS | — | — | — | — | 0.22 | — |
| | Stearic acid | — | — | — | — | — | 3 |
| | Myristic acid | — | — | — | — | — | — |
| | Dicumyl peroxide | 0.8 | 0.8 | 0.8 | 0.8 | 0.8 | 0.8 |
| | Total amount of carboxylic acid | 2.3 | 3.0 | 2.8 | 2.7 | 2.6 | 5.3 |
| Core hardness distribution (JIS-C) | Center hardness | 57.7 | 56.5 | 60.4 | 58.8 | 60.1 | — |
| | 12.5% point hardness | 63.2 | 62.0 | 64.4 | 64.2 | 64.3 | — |
| | 25% point hardness | 66.5 | 65.9 | 66.9 | 66.6 | 66.3 | — |
| | 37.5% point hardness | 67.7 | 67.0 | 67.5 | 67.0 | 66.6 | — |
| | 50% point hardness | 67.7 | 66.8 | 67.2 | 66.7 | 66.4 | — |
| | 62.5% point hardness | 68.2 | 66.5 | 67.9 | 67.2 | 69.4 | — |
| | 75% point hardness | 73.5 | 73.4 | 74.0 | 73.1 | 73.6 | — |
| | 87.5% point hardness | 76.1 | 79.0 | 77.5 | 76.0 | 75.3 | — |
| | Surface hardness | 81.4 | 84.1 | 82.8 | 81.7 | 79.8 | — |
| | Surface hardness − center hardness | 23.7 | 27.6 | 22.4 | 22.9 | 19.7 | — |
| | $R^2$ of approximated curve | 0.92 | 0.89 | 0.89 | 0.88 | 0.93 | — |
| | Slope of approximated curve | 0.20 | 0.23 | 0.19 | 0.19 | 0.17 | — |
| | Core coefficient of restitution | 0.000 | 0.012 | 0.018 | 0.014 | 0.010 | 0.009 |
| | Core compression deformation amount (mm) | 4.29 | 4.06 | 4.11 | 4.19 | 4.07 | 3.95 |
| | Cover composition | A | A | A | A | A | A |
| | Cover hardness (Shore D) | 65 | 65 | 65 | 65 | 65 | 65 |
| | Cover thickness (mm) | 1.5 | 1.5 | 1.5 | 1.5 | 1.5 | 1.5 |

TABLE 9-continued

| | | Golf ball No. | | | | | |
|---|---|---|---|---|---|---|---|
| | | 7 | 8 | 9 | 10 | 11 | 12 |
| | Core No. | 6-2 | 7-3 | 8-2 | 9-2 | 10-2 | 11 |
| Ball | Driver spin rate (rpm) | 0 | −10 | 20 | 30 | 0 | 0 |
| | Driver flying distance (m) | 0 | 0.8 | −1.0 | −1.2 | 0.6 | 0.5 |
| | Coefficient of restitution | 0 | 0.009 | 0.018 | 0.014 | 0.010 | 0.009 |
| | Compression deformation amount (mm) | 3.59 | 3.36 | 3.41 | 3.49 | 3.37 | 3.25 |

TABLE 10

| | | Golf ball No. | | | | | |
|---|---|---|---|---|---|---|---|
| | | 13 | 14 | 15 | 16 | 17 | 18 |
| | Core No. | 1-2 | 1-2 | 2-2 | 3-2 | 4-1 | 5-2 |
| Rubber composition (parts by mass) | BR730 | 100 | 100 | 100 | 100 | 100 | 100 |
| | Sanceler SR | 28 | 28 | 28 | 27 | 24 | 23 |
| | Zinc Oxide | 5 | 5 | 5 | 5 | 5 | 5 |
| | Barium sulfate | *1) | *1) | *1) | *1) | *1) | *1) |
| | 2-Thionaphthol | 0.32 | 0.32 | — | — | — | — |
| | PCTP | — | — | 0.56 | — | — | — |
| | PBDS | — | — | — | 1.0 | — | — |
| | DPDS | — | — | — | — | 0.22 | — |
| | Stearic acid | 10 | 10 | 10 | 10 | 10 | 10 |
| | Myristic acid | — | — | — | — | — | — |
| | Dicumyl peroxide | 0.8 | 0.8 | 0.8 | 0.8 | 0.8 | 0.8 |
| | Total amount of carboxylic acid | 12.8 | 12.8 | 12.8 | 12.7 | 12.4 | 12.3 |
| Core hardness distribution (JIS-C) | Center hardness | 54.2 | 54.2 | 57.0 | 59.0 | 62.3 | 56.9 |
| | 12.5% point hardness | 58.2 | 58.2 | 62.8 | 62.6 | 66.0 | 61.7 |
| | 25% point hardness | 62.5 | 62.5 | 65.6 | 65.7 | 68.4 | 65.7 |
| | 37.5% point hardness | 65.1 | 65.1 | 68.5 | 67.3 | 69.4 | 67.2 |
| | 50% point hardness | 65.9 | 65.9 | 68.8 | 67.9 | 70.0 | 67.8 |
| | 62.5% point hardness | 70.0 | 70.0 | 69.5 | 69.0 | 72.3 | 70.4 |
| | 75% point hardness | 77.7 | 77.7 | 75.2 | 73.0 | 75.7 | 74.6 |
| | 87.5% point hardness | 80.7 | 80.7 | 78.4 | 76.8 | 76.4 | 76.2 |
| | Surface hardness | 83.6 | 83.6 | 82.2 | 81.2 | 80.4 | 80.7 |
| | Surface hardness − center hardness | 29.4 | 29.4 | 25.2 | 22.2 | 18.1 | 23.8 |
| | $R^2$ of approximated curve | 0.98 | 0.98 | 0.96 | 0.95 | 0.97 | 0.97 |
| | Slope of approximated curve | 0.29 | 0.29 | 0.22 | 0.20 | 0.16 | 0.21 |
| | Core coefficient of restitution | 0.016 | 0.016 | 0.020 | 0.017 | 0.013 | 0.002 |
| | Core compression deformation amount (mm) | 3.94 | 3.94 | 4.06 | 4.09 | 3.95 | 4.14 |
| | Cover composition | C | D | C | C | C | C |
| | Cover hardness (Shore D) | 47 | 32 | 47 | 47 | 47 | 47 |
| | Cover thickness (mm) | 1.5 | 1.5 | 1.5 | 1.5 | 1.5 | 1.5 |
| Ball | Driver spin rate (rpm) | −90 | −20 | −70 | −20 | −20 | −70 |
| | Driver flying distance (m) | 4.0 | 2.5 | 4.1 | 2.3 | 2.0 | 1.2 |
| | Coefficient of restitution | 0.017 | 0.011 | 0.020 | 0.018 | 0.012 | 0.001 |
| | Compression deformation amount (mm) | 3.74 | 3.84 | 3.86 | 3.89 | 3.75 | 3.94 |

TABLE 11

| | | Golf ball No. | | | | |
|---|---|---|---|---|---|---|
| | | 19 | 20 | 21 | 22 | 23 |
| | Core No. | 6-2 | 7-3 | 8-2 | 9-2 | 10-2 |
| Rubber composition (parts by mass) | BR730 | 100 | 100 | 100 | 100 | 100 |
| | Sanceler SR | 23 | 30 | 28 | 27 | 26 |
| | Zinc Oxide | 5 | 5 | 5 | 5 | 5 |
| | Barium sulfate | *1) | *1) | *1) | *1) | *1) |
| | 2-Thionaphthol | — | 0.32 | — | — | — |
| | PCTP | — | — | 0.56 | — | — |
| | PBDS | — | — | — | 1.0 | — |
| | DPDS | — | — | — | — | 0.22 |
| | Stearic acid | — | — | — | — | — |
| | Myristic acid | — | — | — | — | — |
| | Dicumyl peroxide | 0.8 | 0.8 | 0.8 | 0.8 | 0.8 |
| | Total amount of carboxylic acid | 2.3 | 3.0 | 2.8 | 2.7 | 2.6 |

TABLE 11-continued

|  |  | Golf ball No. | | | | |
| --- | --- | --- | --- | --- | --- | --- |
|  |  | 19 | 20 | 21 | 22 | 23 |
|  | Core No. | 6-2 | 7-3 | 8-2 | 9-2 | 10-2 |
| Core hardness distribution (JIS-C) | Center hardness | 57.7 | 56.5 | 60.4 | 58.8 | 60.1 |
| | 12.5% point hardness | 63.2 | 62.0 | 64.4 | 64.2 | 64.3 |
| | 25% point hardness | 66.5 | 65.9 | 66.9 | 66.6 | 66.3 |
| | 37.5% point hardness | 67.7 | 67.0 | 67.5 | 67.0 | 66.6 |
| | 50% point hardness | 67.7 | 66.8 | 67.2 | 66.7 | 66.4 |
| | 62.5% point hardness | 68.2 | 66.5 | 67.9 | 67.2 | 69.4 |
| | 75% point hardness | 73.5 | 73.4 | 74.0 | 73.1 | 73.6 |
| | 87.5% point hardness | 76.1 | 79.0 | 77.5 | 76.0 | 75.3 |
| | Surface hardness | 81.4 | 84.1 | 82.8 | 81.7 | 79.8 |
| | Surface hardness − center hardness | 23.7 | 27.6 | 22.4 | 22.9 | 19.7 |
| | $R^2$ of approximated curve | 0.92 | 0.89 | 0.89 | 0.88 | 0.93 |
| | Slope of approximated curve | 0.20 | 0.23 | 0.19 | 0.19 | 0.17 |
| | Core coefficient of restitution | 0.000 | 0.012 | 0.018 | 0.014 | 0.010 |
| | Core compression deformation amount (mm) | 4.29 | 4.06 | 4.11 | 4.19 | 4.07 |
| | Cover composition | C | C | C | C | C |
| | Cover hardness (Shore D) | 47 | 47 | 47 | 47 | 47 |
| | Cover thickness (mm) | 1.5 | 1.5 | 1.5 | 1.5 | 1.5 |
| Ball | Driver spin rate (rpm) | 0 | −10 | 20 | 30 | 0 |
| | Driver flying distance (m) | 0 | 0.7 | −1.0 | −1.2 | 0.5 |
| | Coefficient of restitution | 0 | 0.008 | 0.019 | 0.016 | 0.009 |
| | Compression deformation amount (mm) | 4.09 | 3.86 | 3.91 | 3.99 | 3.87 |

TABLE 12

|  |  | Golf ball No. | | | |
| --- | --- | --- | --- | --- | --- |
|  |  | 24 | 25 | 26 | 27 |
|  | Core No. | 12-3 | 13-2 | 12-3 | 13-2 |
| Rubber composition (parts by mass) | BR730 | 100 | 100 | 100 | 100 |
| | Sanceler SR | 30 | 31 | 30 | 31 |
| | Zinc Oxide | 5 | 5 | 5 | 5 |
| | Barium sulfate | *1) | *1) | *1) | *1) |
| | 2-Thionaphthol | 0.32 | 0.32 | 0.32 | 0.32 |
| | PCTP | — | — | — | — |
| | PBDS | — | — | — | — |
| | DPDS | — | — | — | — |
| | Decanoic acid | — | 5 | — | 5 |
| | Myristic acid | 10 | — | 10 | — |
| | Dicumyl peroxide | 0.8 | 0.8 | 0.8 | 0.8 |
| | Total amount of carboxylic acid | 13.0 | 8.1 | 13.0 | 8.1 |
| Core hardness distribution (JIS-C) | Center hardness | 51.3 | 47.9 | 51.3 | 47.9 |
| | 12.5% point hardness | 55.9 | 54.2 | 55.9 | 54.2 |
| | 25% point hardness | 60.4 | 60.4 | 60.4 | 60.4 |
| | 37.5% point hardness | 63.2 | 63.6 | 63.2 | 63.6 |
| | 50% point hardness | 64.2 | 64.4 | 64.2 | 64.4 |
| | 62.5% point hardness | 69.2 | 67.2 | 69.2 | 67.2 |
| | 75% point hardness | 76.5 | 75.8 | 76.5 | 75.8 |
| | 87.5% point hardness | 79.2 | 79.3 | 79.2 | 79.3 |
| | Surface hardness | 81.7 | 81.7 | 81.7 | 81.7 |
| | Surface hardness − center hardness | 30.4 | 33.8 | 30.4 | 33.8 |
| | $R^2$ of approximated curve | 0.98 | 0.97 | 0.98 | 0.97 |
| | Slope of approximated curve | 0.31 | 0.33 | 0.31 | 0.33 |
| | Core coefficient of restitution | 0.016 | 0.016 | 0.016 | 0.016 |
| | Core compression deformation amount (mm) | 4.00 | 4.00 | 4.00 | 4.00 |
| | Cover composition | A | A | C | C |
| | Cover hardness (Shore D) | 65 | 65 | 47 | 47 |
| | Cover thickness (mm) | 1.5 | 1.5 | 1.5 | 1.5 |
| Ball | Driver spin rate (rpm) | −90 | −100 | −90 | −100 |
| | Driver flying distance (m) | 3.8 | 4.0 | 3.8 | 4.0 |
| | Coefficient of restitution | 0.016 | 0.016 | 0.015 | 0.015 |
| | Compression deformation amount (mm) | 3.30 | 3.30 | 3.80 | 3.80 |

TABLE 13

| | Golf ball (Core) No. | 28 | 29 | 30 | 31 |
|---|---|---|---|---|---|
| Rubber composition (parts by mass) | BR730 | 100 | 100 | 100 | 100 |
| | Sanceler SR | 23 | 31 | 23 | 31 |
| | Zinc Oxide | 5 | 5 | 5 | 5 |
| | Barium sulfate | *1) | *1) | *1) | *1) |
| | 2-Thionaphthol | — | 0.1 | — | 0.1 |
| | PCTP | — | — | — | — |
| | PBDS | — | — | — | — |
| | DPDS | — | — | — | — |
| | Myristic acid | 15 | — | 15 | — |
| | Cyclohexanecarboxylic acid | — | 5 | — | 5 |
| | Dicumyl peroxide | 0.8 | 0.8 | 0.8 | 0.8 |
| | Total amount of carboxylic acid | 17.3 | 8.1 | 17.3 | 8.1 |
| Core hardness distribution (JIS-C) | Center hardness | 50.1 | 46.5 | 50.1 | 46.5 |
| | 12.5% point hardness | 53.4 | 51.3 | 53.4 | 51.3 |
| | 25% point hardness | 57.4 | 58.0 | 57.4 | 58.0 |
| | 37.5% point hardness | 59.9 | 61.5 | 59.9 | 61.5 |
| | 50% point hardness | 62.5 | 62.5 | 62.5 | 62.5 |
| | 62.5% point hardness | 65.1 | 68.9 | 65.1 | 68.9 |
| | 75% point hardness | 68.5 | 76.0 | 68.5 | 76.0 |
| | 87.5% point hardness | 69.3 | 75.2 | 69.3 | 75.2 |
| | Surface hardness | 73.7 | 81.4 | 73.7 | 81.4 |
| | Surface hardness - center hardness | 23.6 | 34.9 | 23.6 | 34.9 |
| | $R^2$ of approximated curve | 0.99 | 0.98 | 0.99 | 0.98 |
| | Slope of approximated curve | 0.23 | 0.34 | 0.23 | 0.34 |
| | Core coefficient of restitution | −0.016 | 0.002 | −0.016 | 0.002 |
| | Core compression deformation amount (mm) | 5.11 | 4.19 | 5.11 | 4.19 |
| | Cover composition | A | A | C | C |
| | Cover hardness (Shore D) | 65 | 65 | 47 | 47 |
| | Cover thickness (mm) | 1.5 | 1.5 | 1.5 | 1.5 |
| Ball | Driver spin rate (rpm) | −20 | −100 | −20 | −100 |
| | Driver flying distance (m) | 0 | 2.8 | 0 | 2.8 |
| | Coefficient of restitution | −0.016 | 0.002 | −0.016 | 0.002 |
| | Compression deformation amount (mm) | 4.41 | 3.49 | 4.91 | 3.99 |

*1) In tables No. 8 to 13, as to an amount of barium sulfate, adjustment was made such that the golf ball had a mass of 45.4 g.

[Evaluation Results]
(1) Resilience of Cores

Figure 2:
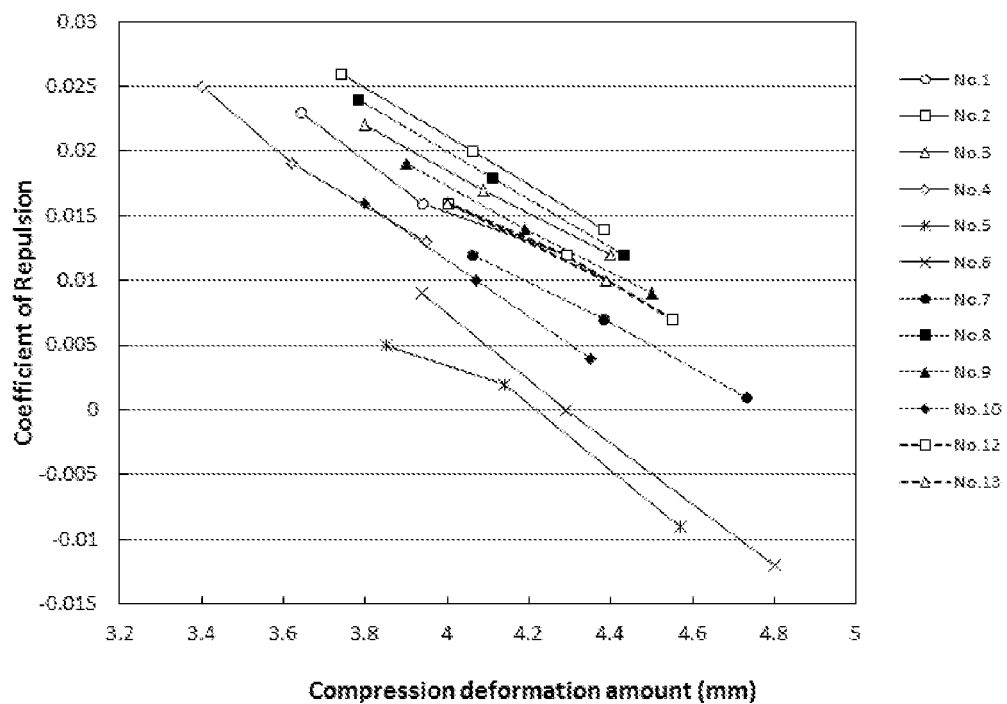
FIG. 2 is a graph showing a relation between the coefficient of restitution and the compression deformation amount.
Figure 3:
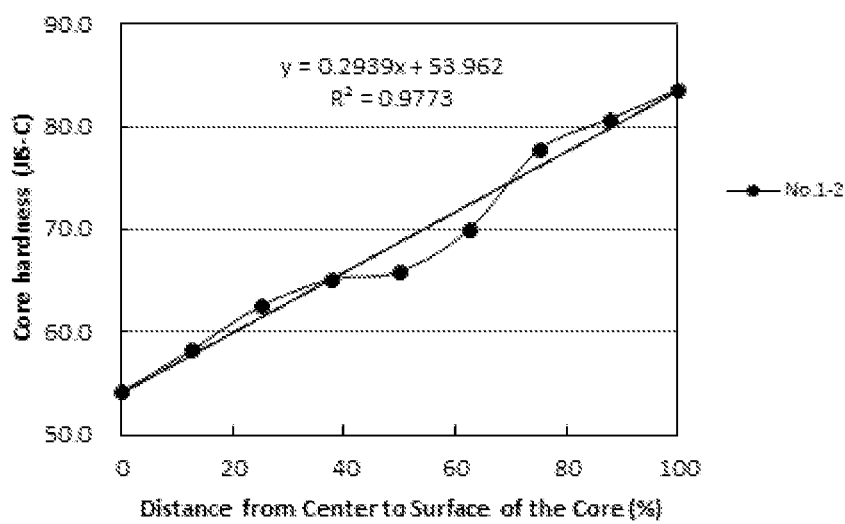
FIG. 3 is a graph showing the hardness distribution of the core.
Figure 4:
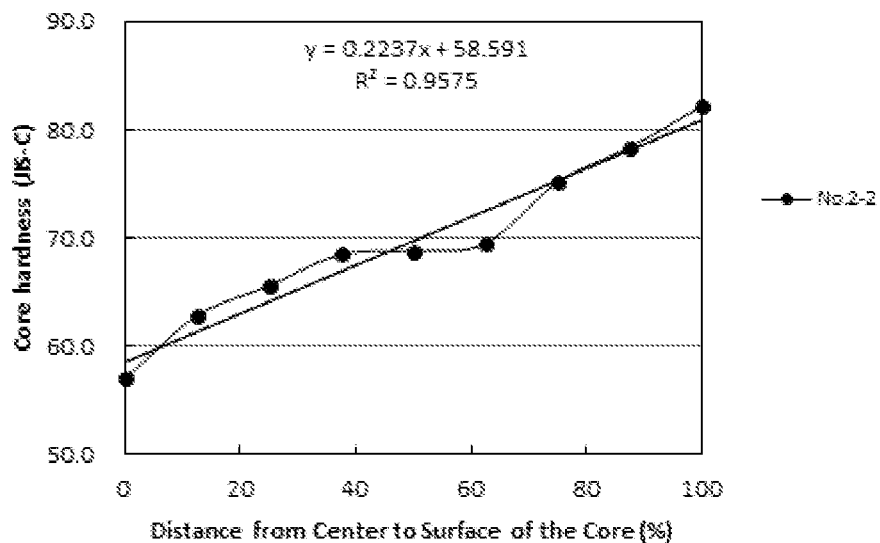
FIG. 4 is a graph showing the hardness distribution of the core.
Figure 5:
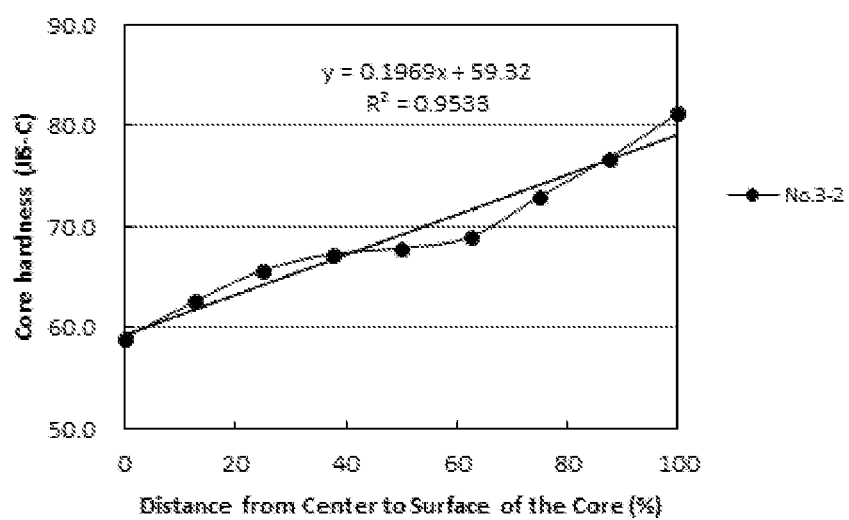
FIG. 5 is a graph showing the hardness distribution of the core.
Figure 6:
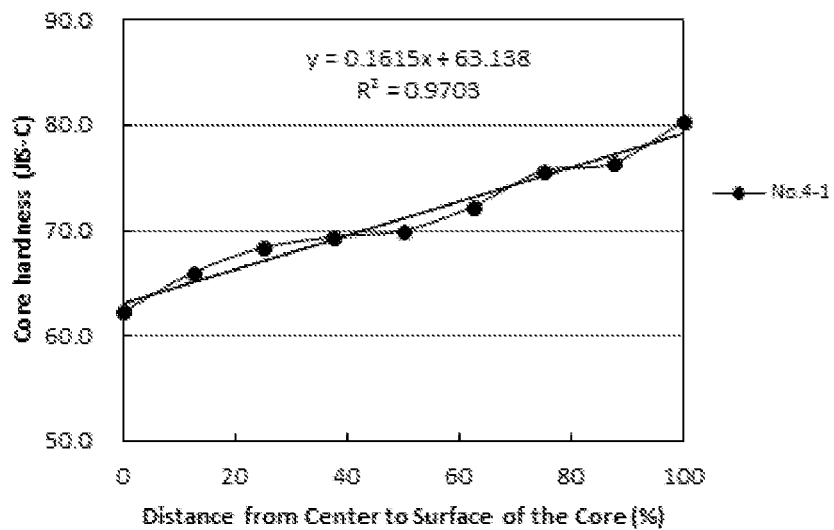
FIG. 6 is a graph showing the hardness distribution of the core.
Figure 7:
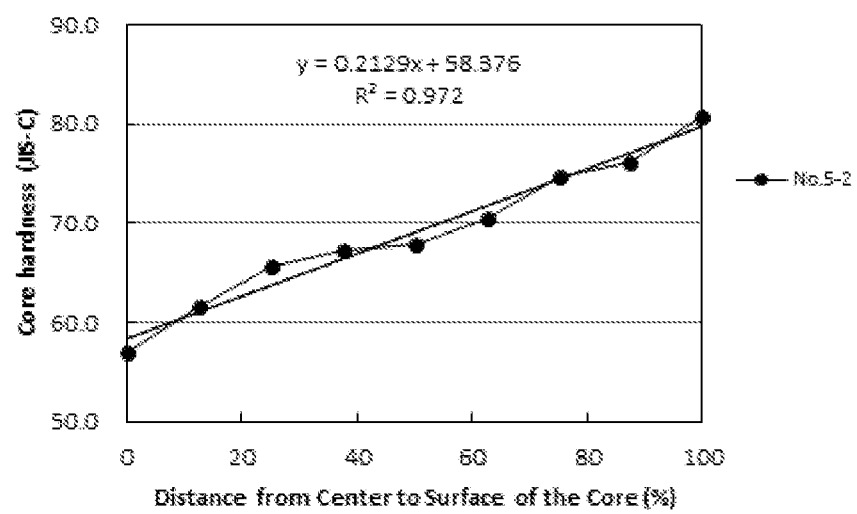
FIG. 7 is a graph showing the hardness distribution of the core.
Figure 8:
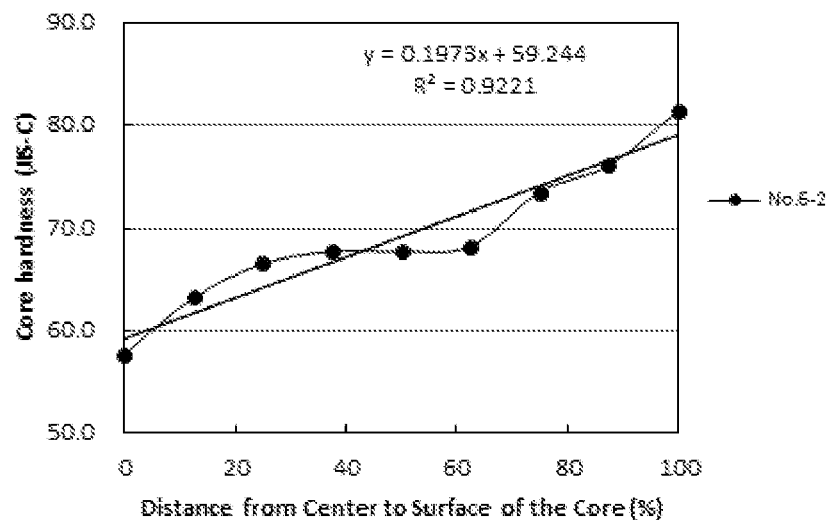
FIG. 8 is a graph showing the hardness distribution of the core.
Figure 9:
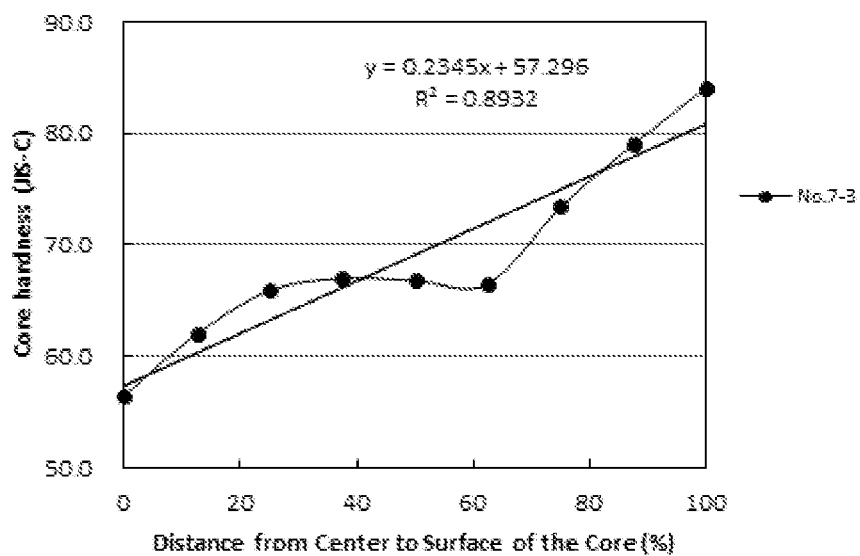
FIG. 9 is a graph showing the hardness distribution of the core.
Figure 10:
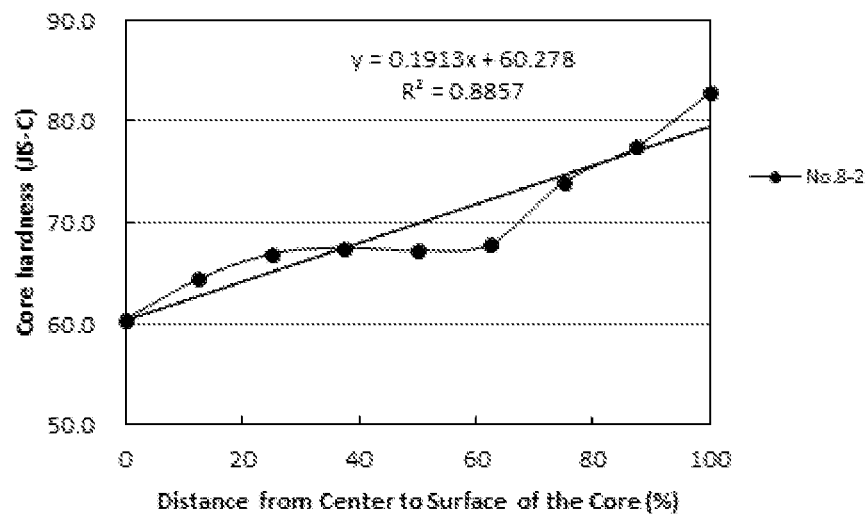
FIG. 10 is a graph showing the hardness distribution of the core.
Figure 11:
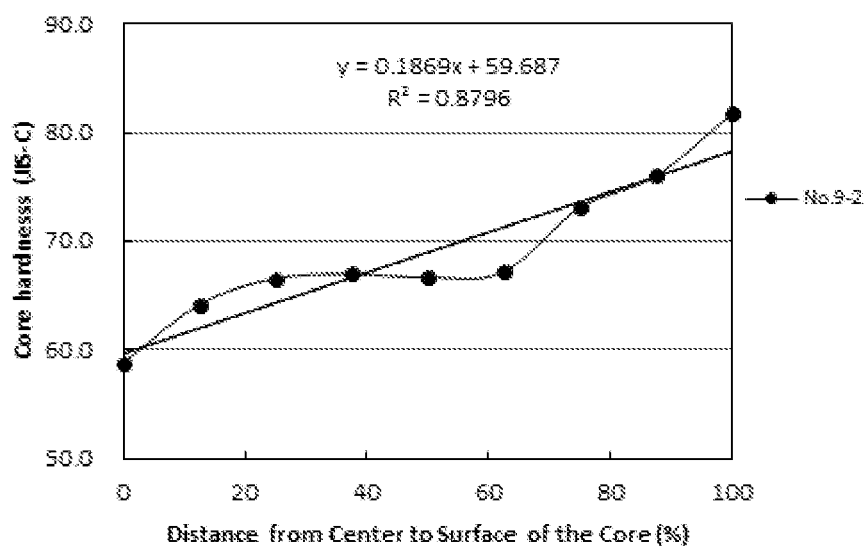
FIG. 11 is a graph showing the hardness distribution of the core.
Figure 12:
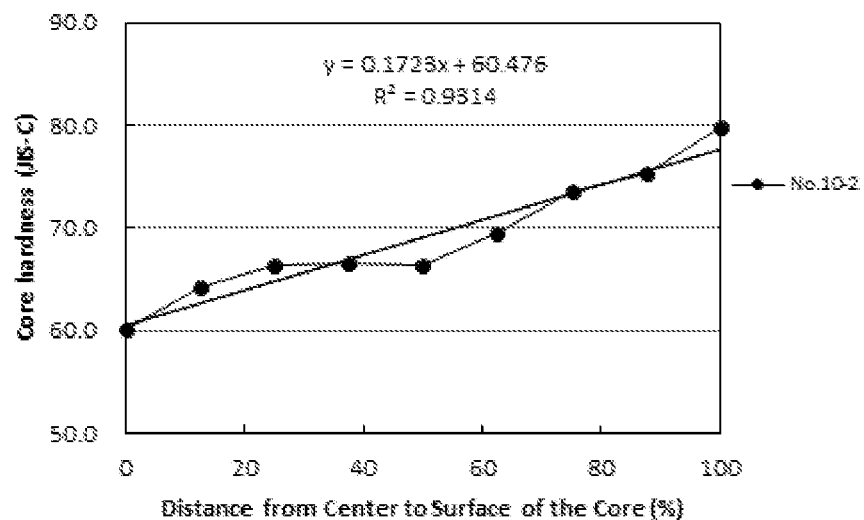
FIG. 12 is a graph showing the hardness distribution of the core.
Figure 13:
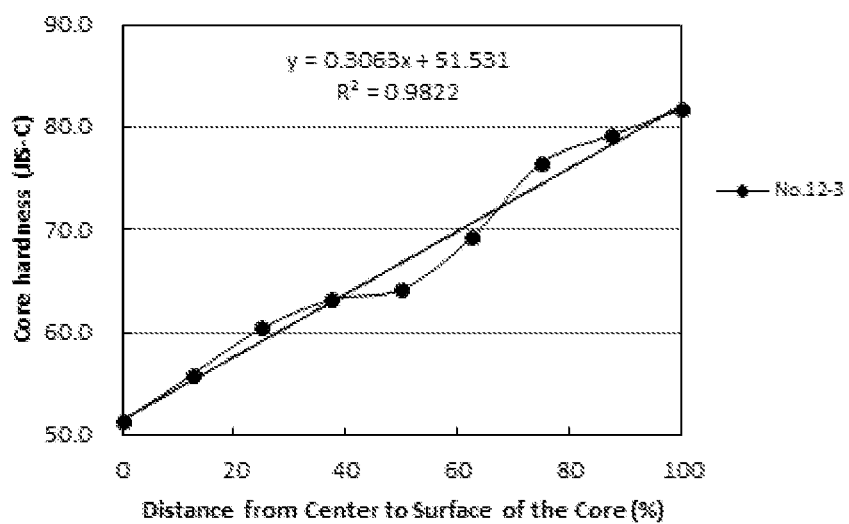
FIG. 13 is a graph showing the hardness distribution of the core.
Figure 14:
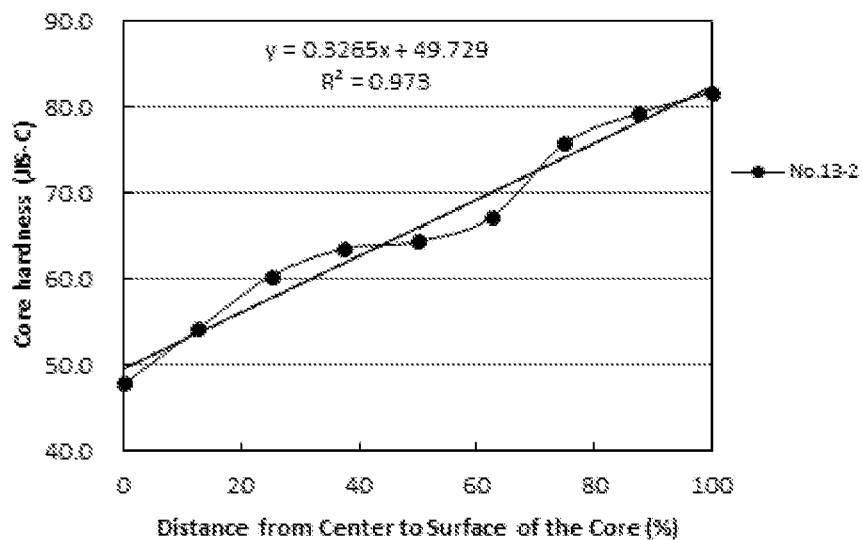
FIG. 14 is a graph showing the hardness distribution of the core.
Figure 15:
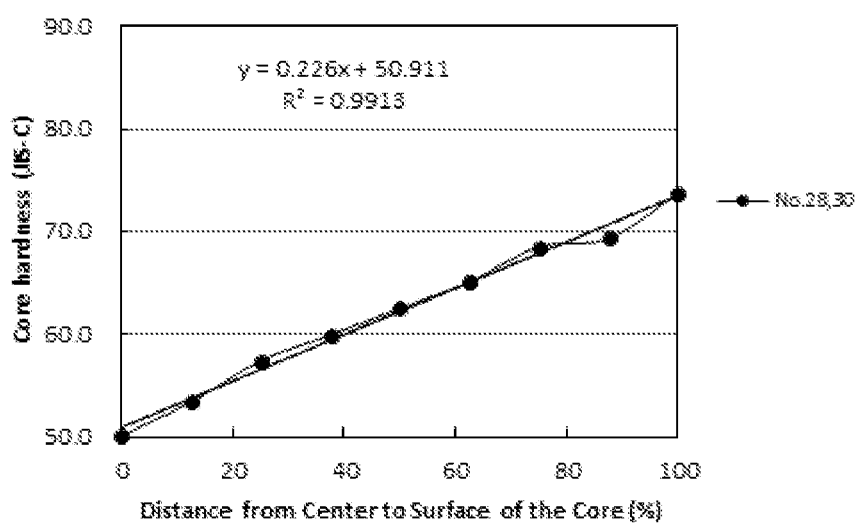
FIG. 15 is a graph showing the hardness distribution of the core.
Figure 16:
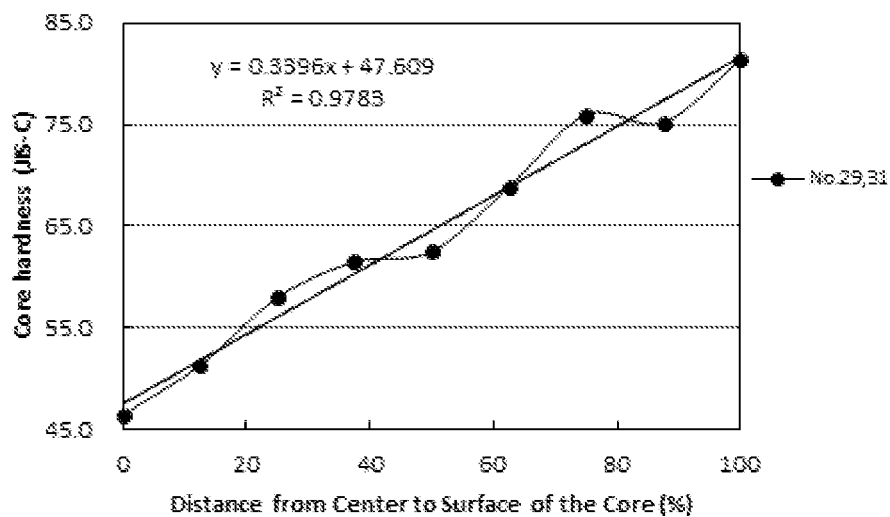
FIG. 16 is a graph showing the hardness distribution of the core.
Figure 17:
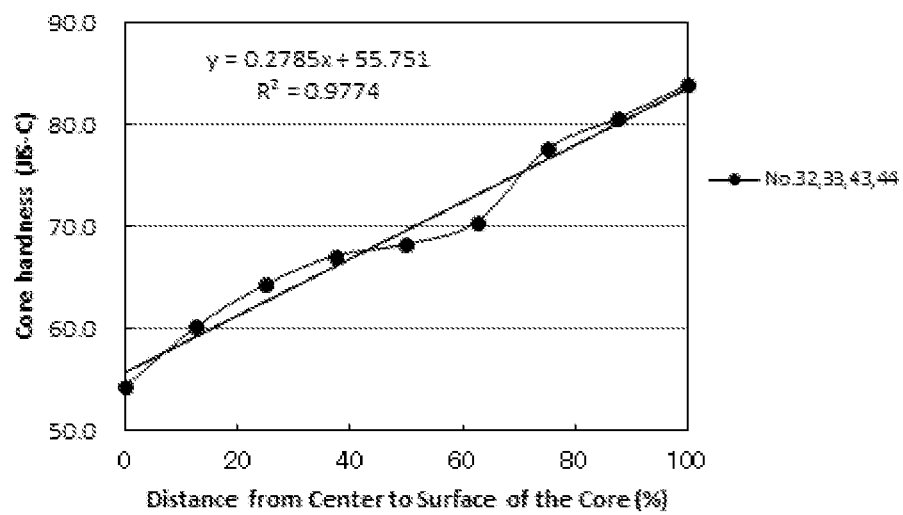
FIG. 17 is a graph showing the hardness distribution of the core.
Figure 18:
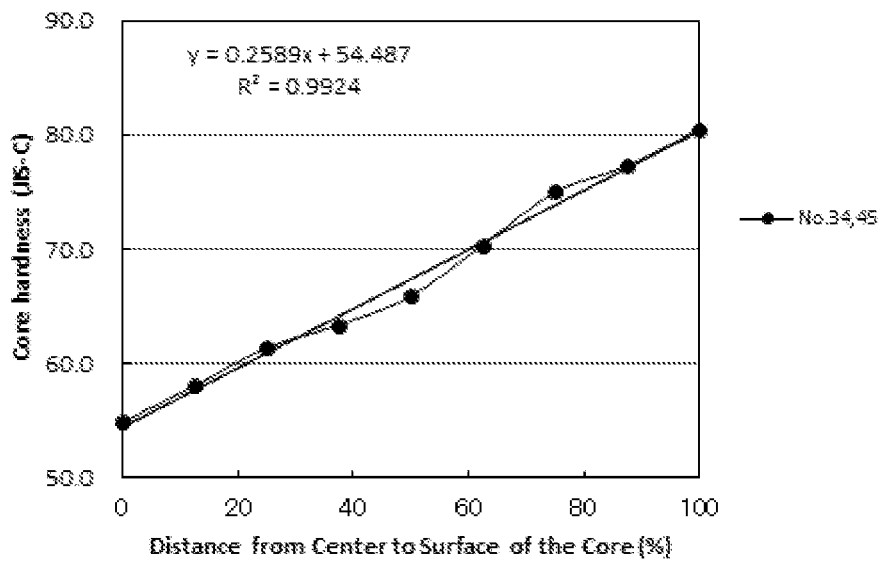
FIG. 18 is a graph showing the hardness distribution of the core.
Figure 19:
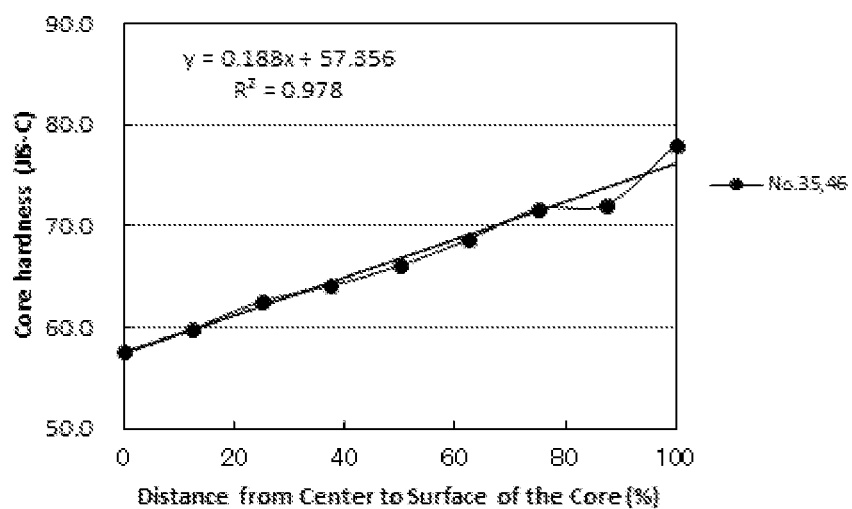
FIG. 19 is a graph showing the hardness distribution of the core.
Figure 20:
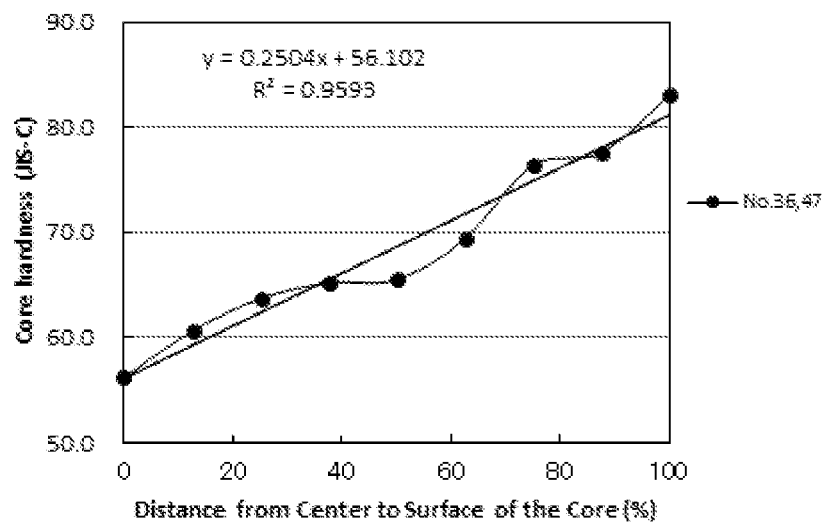
FIG. 20 is a graph showing the hardness distribution of the core.
Figure 21:
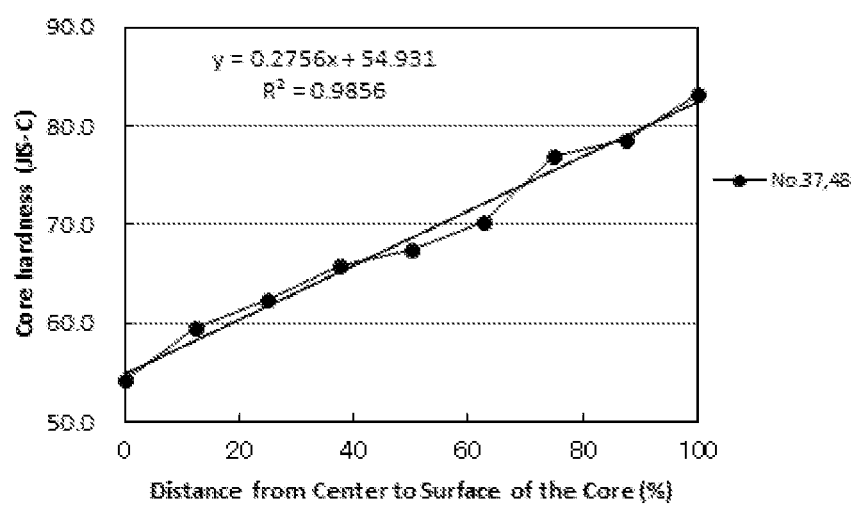
FIG. 21 is a graph showing the hardness distribution of the core.
Figure 22:
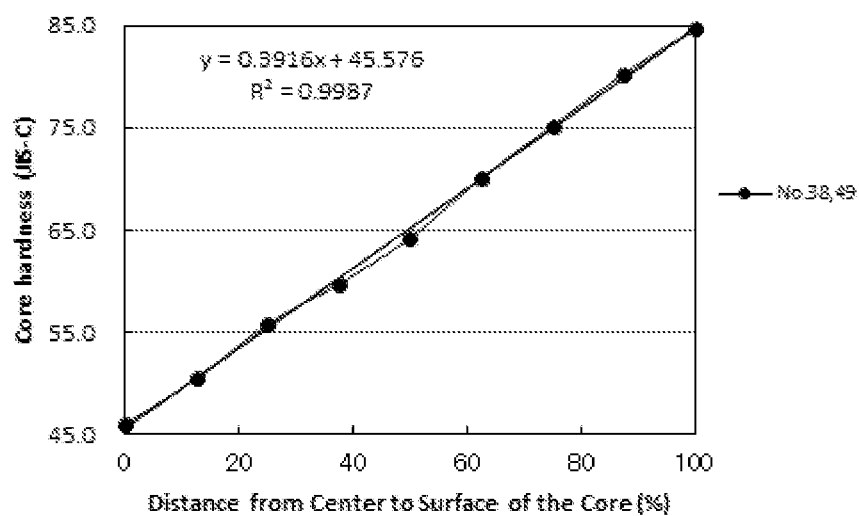
FIG. 22 is a graph showing the hardness distribution of the core.
Figure 23:
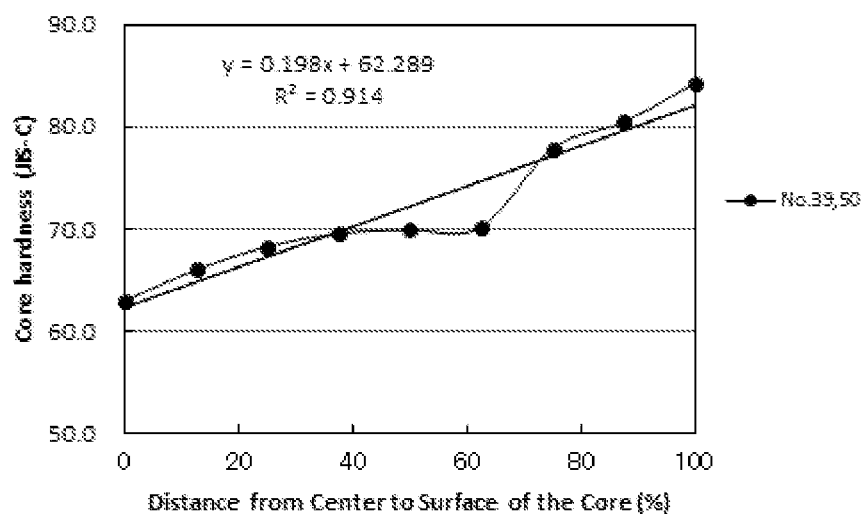
FIG. 23 is a graph showing the hardness distribution of the core.
Figure 24:
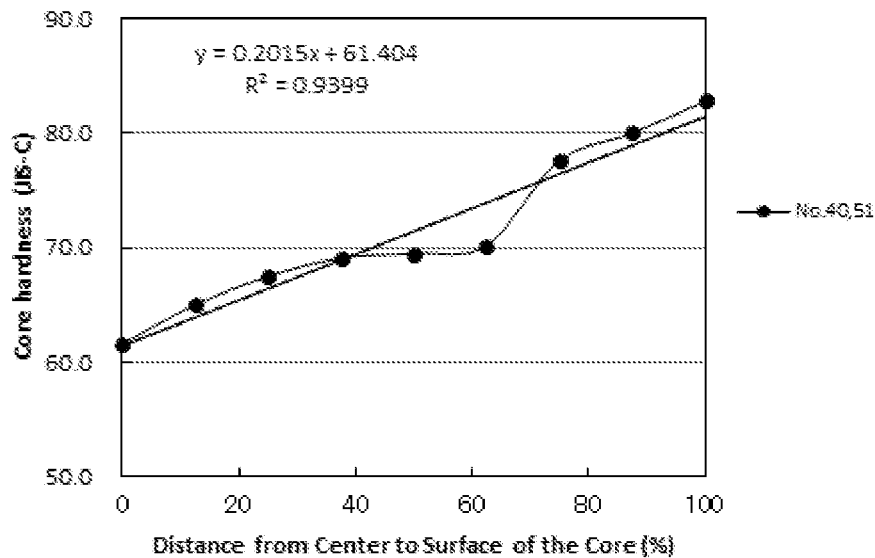
FIG. 24 is a graph showing the hardness distribution of the core.
Figure 25:
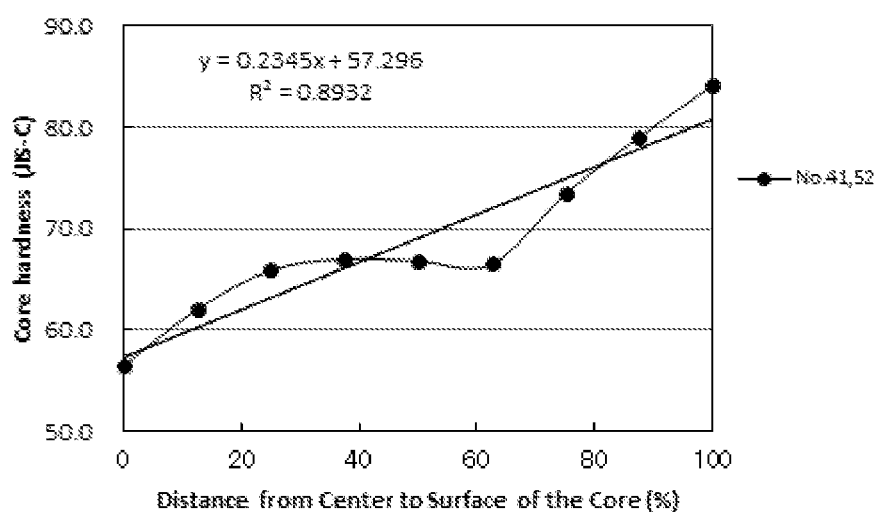
FIG. 25 is a graph showing the hardness distribution of the core.
Figure 26:
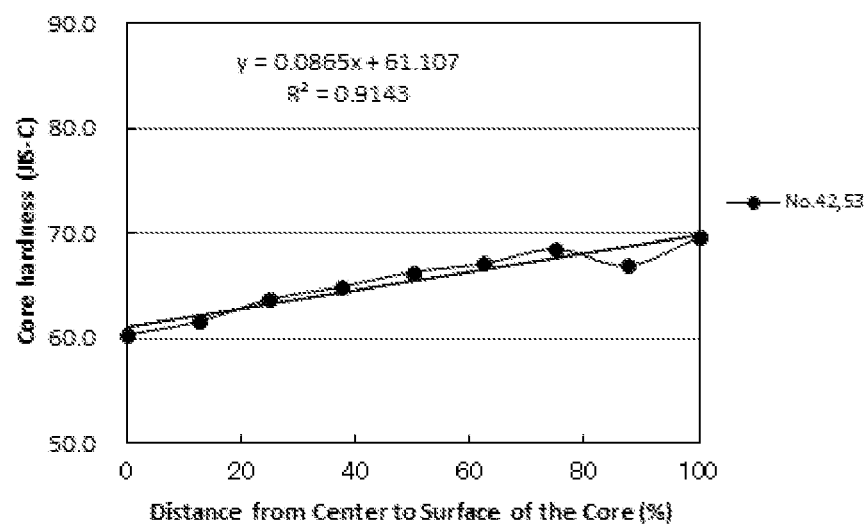
FIG. 26 is a graph showing the hardness distribution of the core.

FIG. 2 shows a relationship between Coefficient of Restitution and compression deformation amount of Cores No. 1 to No. 10, No. 12, and No. 13 shown in Tables 3 to 6. FIG. 2 indicates that cores formed from the rubber composition containing (d) the carboxylic acid and (f) the organic sulfur compound have improved resilience compared with the cores without containing (d) the carboxylic acid at the same compression deformation amount.

(2) Hardness Distribution of Cores

Tables 8 to 13 and FIGS. 3 to 16 show the hardness distribution of the cores. Tables 8 to 13 show that $R^2$ of a linear approximation curve of the hardness distribution of the cores formed from the rubber composition containing (d) the carboxylic acid were all 0.95 or higher, which was higher than those of the cores without containing (d) the carboxylic acid. Further, the slopes of the linear approximation curves were different depending upon the kinds of the organic sulfur compound and the carboxylic acid which were used in combination. It was found that cores No. 1-2 and No. 2-2 using the organic sulfur compound having a thiol group as the organic sulfur compound had a larger hardness difference between the core center and the core surface than cores No. 3-2 and No. 4-1 using the organic sulfur compound having the disulfide bond. Also, it was found that the carboxylic acids having lower carbon atoms tend to provide a larger hardness difference between the core center and the core surface.

(3) Flying Performance of Golf Balls

Tables 8 to 13 show the evaluation results of flying performance of the golf balls. The results of golf balls No. 1 to No. 12, 24, 25, 28, and 29 are shown by the difference in driver spin rate, flight distance, and the coefficient of restitution from the properties of golf ball No. 7, and the results of golf balls No. 13 to No. 23, 26, 27, 30 and 31 are shown by the difference in driver spin rate, flight distance, and the coefficient of restitution from the properties of golf ball No. 19.

Golf balls No. 1 to No. 5, No. 13 to No. 17, No. 24 to No. 27, and No. 28 to No. 31 are the golf balls where the spherical core of the golf ball is formed from the rubber composition comprising (a) the base rubber, (b) the co-crosslinking agent, (c) the crosslinking initiator, (d) the carboxylic acid, and (f) the organic sulfur compound. Golf balls No. 6 and No. 18 are the golf balls where the spherical core is formed from the rubber composition containing (a) the base rubber, (b) the co-crosslinking agent, (c) the crosslinking initiator, and (d) the carboxylic acid without containing (f) the organic sulfur compound. Golf balls No. 7 to No. 12 and golf balls No. 19 to No. 23 are the cases where the spherical core is formed from a conventional rubber composition. Comparison of golf ball No. 1 with golf ball No. 8 indicates that the golf ball No. 1 of the present invention has higher resilience, lower driver spin rate, and greater flight distance than the conventional golf ball No. 8. The same applies to the comparisons of golf ball No. 3 with No. 9, golf ball No. 4 with golf ball No. 10, golf ball No. 5 with golf ball No. 11, golf ball No. 13 with golf ball No. 20, golf ball No. 15 with No. 21, golf ball No. 16 with golf ball No. 22, and golf ball No. 17 with golf ball No. 23, and thus it is clear that the golf ball of the present invention has high resilience and low driver spin rate. As a result, the golf ball of the present invention travels a great flight distance.

The golf ball of the present invention is excellent in flying performance.

[Production of Golf Balls Using the Salt of the Carboxylic Acid]

(1) Production of Cores

The rubber compositions having formulations shown in Tables 14 to 17 were kneaded and heat-pressed in upper and lower molds, each having a hemispherical cavity, at 170° C. for 20 minutes to prepare spherical cores having a diameter of 39.8 mm.

TABLE 14

|  | Golf ball No. | 32 | 33 | 34 | 35 | 36 | 37 |
|---|---|---|---|---|---|---|---|
| Rubber composition (parts by mass) | BR730 | 100 | 100 | 100 | 100 | 100 | 100 |
|  | Sanceler SR | 28 | 28 | 29 | 29 | 27 | — |
|  | ZN-DA90S | — | — | — | — | — | 28 |
|  | Zinc oxide | 5 | 5 | 5 | 5 | 5 | 5 |
|  | Barium sulfate | *1) | *1) | *1) | *1) | *1) | *1) |
|  | 2-Thionaphthol | 0.32 | 0.32 | 0.32 | 0.32 | 0.32 | 0.32 |
|  | Zinc stearate | 10 | 10 | 20 | 30 | — | 10 |
|  | Aluminum stearate | — | — | — | — | 10 | — |
|  | Dicumyl peroxide | 0.8 | 0.8 | 0.8 | 0.8 | 0.8 | 0.8 |
|  | Total amount of carboxylic acid salt | 10 | 10 | 20 | 30 | 10 | 12.8 |
| Core hardness distribution (JIS-C) | Center hardness | 54.4 | 54.4 | 54.9 | 57.6 | 56.2 | 54.3 |
|  | 12.5% point hardness | 60.2 | 60.2 | 58.1 | 59.9 | 60.6 | 59.5 |
|  | 25% point hardness | 64.4 | 64.4 | 61.4 | 62.6 | 63.7 | 62.4 |
|  | 37.5% point hardness | 67.2 | 67.2 | 63.4 | 64.1 | 65.2 | 65.8 |
|  | 50% point hardness | 68.3 | 68.3 | 65.9 | 66.1 | 65.5 | 67.4 |
|  | 62.5% point hardness | 70.5 | 70.5 | 70.4 | 68.7 | 69.4 | 70.2 |
|  | 75% point hardness | 77.6 | 77.6 | 75.0 | 71.7 | 76.4 | 76.9 |
|  | 87.5% point hardness | 80.6 | 80.6 | 77.3 | 72.1 | 77.6 | 78.6 |
|  | Surface hardness | 83.9 | 83.9 | 80.5 | 78.0 | 83.0 | 83.3 |
|  | Surface hardness − center hardness | 29.5 | 29.5 | 25.6 | 20.4 | 26.8 | 29.0 |
|  | $R^2$ of approximated curve | 0.98 | 0.98 | 0.99 | 0.98 | 0.96 | 0.99 |
|  | Slope of approximated curve | 0.28 | 0.28 | 0.26 | 0.19 | 0.25 | 0.28 |
|  | Core compression deformation amount (mm) | 4.13 | 4.13 | 4.19 | 4.40 | 4.11 | 4.14 |
|  | Cover composition | A | B | A | A | A | A |
|  | Cover hardness (Shore D) | 65 | 65 | 65 | 65 | 65 | 65 |
|  | Cover thickness (mm) | 1.5 | 1.5 | 1.5 | 1.5 | 1.5 | 1.5 |
| Ball | Driver spin rate (rpm) | −50 | −20 | −60 | −30 | −40 | −70 |
|  | Driver flying distance (m) | 1.8 | 1.2 | 2.0 | 1.4 | 1.7 | 2.1 |
|  | Compression deformation amount (mm) | 3.43 | 3.53 | 3.49 | 3.70 | 3.41 | 3.44 |

TABLE 15

|  | Golf ball No. | 38 | 39 | 40 | 41 | 42 |
|---|---|---|---|---|---|---|
| Rubber composition (parts by mass) | BR730 | 100 | 100 | 100 | 100 | 100 |
|  | Sanceler SR | 27 | 27 | 27 | 29 | 31 |
|  | Zinc oxide | 5 | 5 | 5 | 5 | 5 |
|  | Barium sulfate | *1) | *1) | *1) | *1) | *1) |
|  | 2-Thionaphthol | — | 0.32 | 0.32 | 0.32 | 0.32 |
|  | Zinc stearate | — | 5 | 7.5 | 0 | 40 |
|  | Zinc myristate | 15 | — | — | — | — |
|  | Dicumyl peroxide | 0.8 | 0.8 | 0.8 | 0.8 | 0.8 |
|  | Total amount of carboxylic acid salt | 15 | 5 | 7.5 | 0 | 40 |
| Core hardness distribution (JIS-C) | Center hardness | 46.0 | 63.0 | 61.6 | 56.5 | 60.3 |
|  | 12.5% point hardness | 50.4 | 66.0 | 65.0 | 62.0 | 61.6 |
|  | 25% point hardness | 55.8 | 68.3 | 67.5 | 65.9 | 63.7 |
|  | 37.5% point hardness | 59.7 | 69.6 | 69.1 | 67.0 | 64.9 |
|  | 50% point hardness | 64.2 | 69.9 | 69.5 | 66.8 | 66.3 |
|  | 62.5% point hardness | 70.1 | 70.2 | 70.2 | 66.5 | 67.1 |
|  | 75% point hardness | 75.2 | 77.9 | 77.6 | 73.4 | 68.5 |
|  | 87.5% point hardness | 80.3 | 80.5 | 80.0 | 79.0 | 66.9 |
|  | Surface hardness | 84.7 | 84.3 | 82.8 | 84.1 | 69.6 |
|  | Surface hardness − center hardness | 38.7 | 21.3 | 21.2 | 27.6 | 9.3 |
|  | $R^2$ of approximated curve | 1.00 | 0.91 | 0.94 | 0.89 | 0.91 |
|  | Slope of approximated curve | 0.39 | 0.20 | 0.20 | 0.23 | 0.09 |
|  | Core compression deformation amount (mm) | 4.53 | 4.08 | 4.09 | 4.36 | 4.39 |
|  | Cover composition | A | A | A | A | A |
|  | Cover hardness (Shore D) | 65 | 65 | 65 | 65 | 65 |
|  | Cover thickness (mm) | 1.5 | 1.5 | 1.5 | 1.5 | 1.5 |
| Ball | Driver spin rate (rpm) | −120 | 50 | 10 | 0 | 60 |
|  | Driver flying distance (m) | 2.3 | −1.8 | −1.0 | 0 | −2.2 |
|  | Compression deformation amount (mm) | 3.83 | 3.38 | 3.39 | 3.66 | 3.69 |

TABLE 16

| | Golf ball No. | 43 | 44 | 45 | 46 | 47 | 48 |
|---|---|---|---|---|---|---|---|
| Rubber composition (parts by mass) | BR730 | 100 | 100 | 100 | 100 | 100 | 100 |
| | Sanceler SR | 28 | 28 | 29 | 29 | 27 | — |
| | ZN-DA90S | — | — | — | — | — | 28 |
| | Zinc oxide | 5 | 5 | 5 | 5 | 5 | 5 |
| | Barium sulfate | *1) | *1) | *1) | *1) | *1) | *1) |
| | 2-Thionaphthol | 0.32 | 0.32 | 0.32 | 0.32 | 0.32 | 0.32 |
| | Zinc stearate | 10 | 10 | 20 | 30 | — | 10 |
| | Aluminum stearate | — | — | — | — | 10 | — |
| | Dicumyl peroxide | 0.8 | 0.8 | 0.8 | 0.8 | 0.8 | 0.8 |
| | Total amount of carboxylic acid salt | 10 | 10 | 20 | 30 | 10 | 12.8 |
| Core hardness distribution (JIS-C) | Center hardness | 54.4 | 54.4 | 54.9 | 57.6 | 56.2 | 54.3 |
| | 12.5% point hardness | 60.2 | 60.2 | 58.1 | 59.9 | 60.6 | 59.5 |
| | 25% point hardness | 64.4 | 64.4 | 61.4 | 62.6 | 63.7 | 62.4 |
| | 37.5% point hardness | 67.2 | 67.2 | 63.4 | 64.1 | 65.2 | 65.8 |
| | 50% point hardness | 68.3 | 68.3 | 65.9 | 66.1 | 65.5 | 67.4 |
| | 62.5% point hardness | 70.5 | 70.5 | 70.4 | 68.7 | 69.4 | 70.2 |
| | 75% point hardness | 77.6 | 77.6 | 75.0 | 71.7 | 76.4 | 76.9 |
| | 87.5% point hardness | 80.6 | 80.6 | 77.3 | 72.1 | 77.6 | 78.6 |
| | Surface hardness | 83.9 | 83.9 | 80.5 | 78.0 | 83.0 | 83.3 |
| | Surface hardness − center hardness | 29.5 | 29.5 | 25.6 | 20.4 | 26.8 | 29.0 |
| | $R^2$ of approximated curve | 0.98 | 0.98 | 0.99 | 0.98 | 0.96 | 0.99 |
| | Slope of approximated curve | 0.28 | 0.28 | 0.26 | 0.19 | 0.25 | 0.28 |
| | Core compression deformation amount (mm) | 4.13 | 4.13 | 4.19 | 4.40 | 4.11 | 4.14 |
| | Cover composition | C | D | C | C | C | C |
| | Cover hardness (Shore D) | 47 | 32 | 47 | 47 | 47 | 47 |
| | Cover thickness (mm) | 1.5 | 1.5 | 1.5 | 1.5 | 1.5 | 1.5 |
| Ball | Driver spin rate (rpm) | −60 | −30 | −70 | −40 | −40 | −70 |
| | Driver flying distance (m) | 2.1 | 1.4 | 2.2 | 1.5 | 1.8 | 2.2 |
| | Compression deformation amount (mm) | 3.93 | 4.03 | 3.99 | 4.20 | 3.91 | 3.94 |

TABLE 17

| | Golf ball No. | 49 | 50 | 51 | 52 | 53 |
|---|---|---|---|---|---|---|
| Rubber composition (parts by mass) | BR730 | 100 | 100 | 100 | 100 | 100 |
| | Sanceler SR | 27 | 27 | 27 | 29 | 31 |
| | Zinc oxide | 5 | 5 | 5 | 5 | 5 |
| | Barium sulfate | *1) | *1) | *1) | *1) | *1) |
| | 2-Thionaphthol | — | 0.32 | 0.32 | 0.32 | 0.32 |
| | Zinc stearate | — | 5 | 7.5 | — | 40 |
| | Zinc myristate | 15 | — | — | — | — |
| | Dicumyl peroxide | 0.8 | 0.8 | 0.8 | 0.8 | 0.8 |
| | Total amount of carboxylic acid salt | 15 | 5 | 7.5 | 0 | 40 |
| Core hardness distribution (JIS-C) | Center hardness | 46.0 | 63.0 | 61.6 | 56.5 | 60.3 |
| | 12.5% point hardness | 50.4 | 66.0 | 65.0 | 62.0 | 61.6 |
| | 25% point hardness | 55.8 | 68.3 | 67.5 | 65.9 | 63.7 |
| | 37.5% point hardness | 59.7 | 69.6 | 69.1 | 67.0 | 64.9 |
| | 50% point hardness | 64.2 | 69.9 | 69.5 | 66.8 | 66.3 |
| | 62.5% point hardness | 70.1 | 70.2 | 70.2 | 66.5 | 67.1 |
| | 75% point hardness | 75.2 | 77.9 | 77.6 | 73.4 | 68.5 |
| | 87.5% point hardness | 80.3 | 80.5 | 80.0 | 79.0 | 66.9 |
| | Surface hardness | 84.7 | 84.3 | 82.8 | 84.1 | 69.6 |
| | Surface hardness − center hardness | 38.7 | 21.3 | 21.2 | 27.6 | 9.3 |
| | $R^2$ of approximated curve | 1.00 | 0.91 | 0.94 | 0.89 | 0.91 |
| | Slope of approximated curve | 0.39 | 0.20 | 0.20 | 0.23 | 0.09 |
| | Core compression deformation amount (mm) | 4.53 | 4.08 | 4.09 | 4.36 | 4.39 |
| | Cover composition | C | C | C | C | C |
| | Cover hardness (Shore D) | 47 | 47 | 47 | 47 | 47 |
| | Cover thickness (mm) | 1.5 | 1.5 | 1.5 | 1.5 | 1.5 |

TABLE 17-continued

| | Golf ball No. | 49 | 50 | 51 | 52 | 53 |
|---|---|---|---|---|---|---|
| Ball | Driver spin rate (rpm) | −120 | 40 | 20 | 0 | 60 |
| | Driver flying distance (m) | 2.3 | −1.7 | −1.5 | 0 | −2.1 |
| | Compression deformation amount (mm) | 4.33 | 3.88 | 3.88 | 4.16 | 4.19 |

*1) In tables No. 14 to 17, as to an amount of barium sulfate, adjustment was made such that the golf ball had a mass of 45.4 g.
BR730: a high-cis polybutadiene (cis-1,4 bond content = 96 mass %, 1,2-vinyl bond content = 1.3 mass %, Moony viscosity (ML$_{1+4}$ (100° C.) = 55, molecular weight distribution (Mw/Mn) = 3) available from JSR Corporation
Sanceler SR: zinc acrylate (product of 10 mass % stearic acid coating) available from Sanshin Chemical Industry Co., Ltd.
ZN-DA90S: zinc acrylate (product of 10 mass % stearic acid coating) available from Nihon Jyoryu Kogyo Co., Ltd.
Zinc oxide: "Ginrei R" manufactured by Toho Zinc Co., Ltd.
Barium sulfate: "Barium sulfate BD" manufactured by Sakai Chemical Industry Co., Ltd., adjustment was made such that the finally obtained golf ball had a mass of 45.4 g.
2-thionaphthol: manufactured by Tokyo Chemical Industry Co., Ltd.
Zinc myristate: available from NOF Corporation (Purity: 90% or more)
Zinc stearate: available from Wako Pure Chemical Industries, Ltd.
Aluminum stearate: manufactured by Mitsuwa Chemicals Co., Ltd.
Dicumyl peroxide: "PERCUMYL ® D" available from NOF Corporation.

(2) Production of Cover

Cover materials shown in Table 7 were mixed with a twin-screw kneading extruder to prepare the cover compositions in the pellet form. The extruding conditions of the cover composition were a screw diameter of 45 mm, a screw rotational speed of 200 rpm, and screw L/D=35, and the mixtures were heated to 150 to 230° C. at the die position of the extruder. The cover compositions obtained above were injection-molded onto the spherical cores to produce the golf balls having the spherical core and the cover covering the spherical core. The cover compositions having Shore D hardness of 50 or more were used for preparing distance-type golf balls No. 32 to No. 42 and the cover compositions having Shore D hardness of less than 50 were used to produce the spin-type golf balls No. 43 to No. 53.

[Evaluation Results]

(1) Hardness Distribution of Cores

Tables 14 to 17 and FIGS. 17 to 26 show the hardness distribution of the cores. Tables 14 to 17 show that $R^2$ of a linear approximation curve of the hardness distribution of the cores formed from the rubber composition containing a predetermined amount of (d) the salt of the carboxylic acid are all 0.95 or higher, which is higher than those of the cores without containing a predetermined amount of (d) the salt of the carboxylic acid.

(2) Flying Performance of Golf Balls

Tables 14 to 17 show the evaluation results of flying performance of the golf balls. The results of golf balls No. 32 to No. 42 are shown by the difference in driver spin rate, and flight distance from the properties of golf ball No. 41, and the results of golf balls No. 43 to No. 53 are shown by the difference in driver spin rate, flight distance from the properties of golf ball No. 52.

Golf balls No. 32 to No. 38, and No. 43 to No. 49 are the golf balls where the spherical cores of the golf balls are formed from the rubber compositions comprising (a) the base rubber, (b) the co-crosslinking agent, (c) the crosslinking initiator, (d) the salt of the carboxylic acid. Golf balls No. 39, No. 41, No. 50 and No. 51 are the cases where the rubber composition comprises a smaller amount of (d) the salt of the carboxylic acid. Golf ball No. 41 and golf ball No. 52 are the cases where the rubber composition does not comprise (d) the salt of the carboxylic acid. Comparison of golf balls No. 32 to No. 38 with golf balls No. 39 to No. 42 indicates that the golf balls No. 32 to No. 38 of the present invention have lower driver spin rate and greater flight distance than the golf balls No. 39 to No. 42. The same applies to the comparison of golf ball No. 43 to No. 49 with golf balls No. 50 to No. 53.

The invention claimed is:

1. A golf ball having a spherical core and at least one cover layer covering the spherical core, wherein the spherical core is formed from a rubber composition containing (a) a base rubber consisting of polybutadiene rubber or a mixture of polybutadiene rubber with at least one member selected from the group consisting of natural rubber, polyisoprene rubber, styrene polybutadiene rubber, and ethylene-propylene-diene rubber, (b) an α,β-unsaturated carboxylic acid having 3 to 8 carbon atoms and/or a metal salt thereof as a co-crosslinking agent, (c) a crosslinking initiator, (d2) an aromatic carboxylic acid salt, and (f) an organic sulfur compound that is at least one member selected from the group consisting of thiophenol or a derivative thereof, diphenyl disulfide or a derivative thereof, thionaphthol or a derivative thereof, thiuram disulfide or a derivative thereof, and a metal salt thereof, provided that the rubber composition further contains (e) a metal compound in the case of containing only (b) the α,β-unsaturated carboxylic acid having 3 to 8 carbon atoms as the co-crosslinking agent, wherein the rubber composition contains (d2) the aromatic carboxylic acid salt in a content of 10 parts by mass or more and less than 40 parts by mass with respect to 100 parts by mass of (a) the base rubber.

2. The golf ball according to claim 1, wherein the rubber composition contains (f) the organic sulfur compound in a content ranging from 0.05 part by mass to 5 parts by mass with respect to 100 parts by mass of (a) the base rubber.

3. The golf ball according to claim 1, wherein the rubber composition contains (b) the α,β-unsaturated carboxylic acid having 3 to 8 carbon atoms and/or the metal salt thereof in a content ranging from 15 parts by mass to 50 parts by mass with respect to 100 parts by mass of (a) the base rubber.

4. The golf ball according to claim 1, wherein the rubber composition contains (b) the metal salt of the α,β-unsaturated carboxylic acid having 3 to 8 carbon atoms as the co-crosslinking agent.

5. The golf ball according to claim 1, wherein the spherical core has a hardness difference of 20 or more in JIS-C hardness between a surface hardness and a center hardness thereof.

6. A golf ball having a spherical core and at least one cover layer covering the spherical core, wherein the spherical core is formed from a rubber composition containing (a) a base rubber consisting of polybutadiene rubber or a mixture of polybutadiene rubber with at least one member selected from the group consisting of natural rubber, polyisoprene rubber, styrene polybutadiene rubber and ethylene-propylene-diene rubber, (b) an α,β-unsaturated carboxylic acid having 3 to 8 carbon atoms and/or a metal salt thereof as a co-crosslinking agent, (c) a crosslinking initiator, (d1) an aromatic carboxylic acid, and (f) an organic sulfur compound which is at least one member selected from the group consisting of thiophenol or a derivative thereof, diphenyl disulfide or a derivative thereof, thionaphthol or a derivative thereof, thiuram disulfide or a derivative thereof, and a metal salt thereof, provided that the rubber composition further contains (e) a metal compound in the case of containing only (b) the α,β-unsaturated carboxylic acid having 3 to 8 carbon atoms as the co-crosslinking agent, wherein the rubber composition contains (d1) the aromatic carboxylic acid in an amount ranging from 7.5 parts to 40 parts by mass with respect to 100 parts by mass of (a) the base rubber.

7. The golf ball according to claim 1, wherein (a) the base rubber consists of a high-cis polybutadiene having a Mooney viscosity ($ML_{1+4}$ (100° C.)) of ranging from 30 to 140.

8. The golf ball according to claim 6, wherein (a) the base rubber consists of a high-cis polybutadiene having a Mooney viscosity ($ML_{1+4}$ (100° C.)) of ranging from 30 to 140.

* * * * *